United States Patent
Chao et al.

(10) Patent No.: US 11,914,821 B2
(45) Date of Patent: Feb. 27, 2024

(54) ELECTRONIC SYSTEM, TOUCH PANEL, TOUCH SENSITIVE PROCESSING APPARATUS AND METHOD THEREOF

(71) Applicant: EGALAX_EMPIA TECHNOLOGY INC., Taipei (TW)

(72) Inventors: Chin-Hsiang Chao, Taipei (TW); Chun-Jung Huang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 18/109,471

(22) Filed: Feb. 14, 2023

(65) Prior Publication Data

US 2023/0266848 A1 Aug. 24, 2023

(30) Foreign Application Priority Data

Feb. 14, 2022 (TW) .................................. 111105256

(51) Int. Cl.
*G06F 3/044* (2006.01)
(52) U.S. Cl.
CPC .................................... *G06F 3/044* (2013.01)
(58) Field of Classification Search
None
See application file for complete search history.

(56) References Cited

U.S. PATENT DOCUMENTS

| | | | |
|---|---|---|---|
| 2008/0196945 A1* | 8/2008 | Konstas | G06F 3/03547 178/18.03 |
| 2019/0079576 A1* | 3/2019 | Liu | G06F 3/04166 |
| 2021/0373740 A1 | 12/2021 | Yeh | |

FOREIGN PATENT DOCUMENTS

TW 202144980 A 12/2021

* cited by examiner

*Primary Examiner* — Stephen T. Reed
(74) *Attorney, Agent, or Firm* — WPAT, PC

(57) ABSTRACT

A touch sensitive processing method, comprising: performing capacitance sensing by a touch panel to gather an approximating or touching position of an external conductive object with regard to the touch panel; determining whether the approximating or touching position is within a non-report area, wherein a shape of the non-report area is a circle or an ellipse; when the approximating or touching position is determined outside the non-report area, reporting the approximating or touching position to a host; and when the approximating or touching position is determined inside the non-report area, ignoring the approximating or touching position.

22 Claims, 16 Drawing Sheets

ELECTRONIC SYSTEM, TOUCH PANEL, TOUCH SENSITIVE PROCESSING APPARATUS AND METHOD THEREOF

CROSS REFERENCE TO RELATED PATENT APPLICATION

This patent application is based on a Taiwan, R.O.C. patent application No. 111105256 filed on Feb. 14, 2022.

FIELD OF THE INVENTION

The present invention relates to touch sensitive, and more particularly, to annulus touch sensitive area.

BACKGROUND OF THE INVENTION

Touch panels and touch screens are common input apparatuses in modern electronic systems. However, shapes of these touch panels and touch screens are usually rectangular. They cannot meet specific needs of annulus touch sensitive area. The present application provides solutions of annulus touch sensitive area to fulfill the specific needs.

SUMMARY OF THE INVENTION

According to an embodiment of the present application, a touch sensitive processing method is provided. The touch sensitive processing method comprising: performing capacitance sensing by a touch panel to gather an approximating or touching position of an external conductive object with regard to the touch panel; determining whether the approximating or touching position is within a non-report area, wherein a shape of the non-report area is a circle or an ellipse; when the approximating or touching position is determined outside the non-report area, reporting the approximating or touching position to a host; and when the approximating or touching position is determined inside the non-report area, ignoring the approximating or touching position.

Preferably, in order to provide an annulus report area on a rectangular touch panel, when the approximating or touching position is outside the non-report area, the touch sensitive processing method further comprises: determining whether the approximating or touching position is within a report area, wherein the report area includes the non-report area, and a shape of the report area is a circle or an ellipse; when the approximating or touching position is within the report area, reporting the approximating or touching position to the host; when the approximating or touching position is outside the report area, ignoring the approximating or touching position.

Preferably, in order to quickly determining whether the approximating or touching position is required to be reported to the host for saving computing resources or memory resources to record the position of the non-report area and to determine whether the approximating or touching position is within the non-report area, when the shape of the non-report area is a circle, the determining whether the approximating or touching position is within a non-report area comprises: calculating a first function value $(x-Cx)^2+(y-Cy)^2$, where coordinates of the approximating or touching position are (x, y), a center of the non-report area is at (Cx, Cy); calculating a square value of a radius of the non-report area; comparing the first function value with the square value of the radius of the non-report area; when the first function value is larger than the square value, it is determined that the approximating or touching position is outside the non-report area; and when the first function value is smaller than the square value, it is determined that the approximating or touching position is within the non-report area, when the shape of the non-report area is an ellipse, the determining whether the approximating or touching position is within a non-report area comprises calculating a second function value $(x-Cx)^2/a^2+(y-Cy)^2/b^2$, where a length of one of the major and the minor axes in parallel to an axis "x" is "a" and a length of another one of the major and the minor axes in parallel to an axis "y" is "b"; comparing the second function value with 1; when the second function value is larger than 1, it is determined that the approximating or touching position is outside the non-report area; and when the second function value equals to or less than 1, it is determined that the approximating or touching position is within the non-report area.

Preferably, in order to quickly determining whether the approximating or touching position is required to be reported to the host for saving computing resources or memory resources to record the position of the report area and to determine whether the approximating or touching position is within the report area, when the shape of the report area is a circle, the determining whether the approximating or touching position is within a report area comprises: calculating a first function value $(x-Cx)^2+(y-Cy)^2$, where coordinates of the approximating or touching position are (x, y), a center of the report area is at (Cx, Cy); calculating a square value of a radius of the report area; comparing the first function value with the square value of the radius of the report area; when the first function value is larger than the square value, it is determined that the approximating or touching position is outside the report area; and when the first function value is smaller than the square value, it is determined that the approximating or touching position is within the report area, when the shape of the non-report area is an ellipse, the determining whether the approximating or touching position is within a report area comprises calculating a second function value $(x-Cx)^2/a^2+(y-Cy)^2/b^2$, where a length of one of the major and the minor axes in parallel to an axis "x" is "a" and a length of another one of the major and the minor axes in parallel to an axis "y" is "b"; comparing the second function value with 1; when the second function value is larger than 1, it is determined that the approximating or touching position is outside the report area; and when the second function value equals to or less than 1, it is determined that the approximating or touching position is within the report area.

Preferably, in order to provide asymmetric and annulus touch sensitive area, wherein a center of the report area is not at a center of the non-report area.

Preferably, in order to utilize non-rectangular touch panel, wherein a shape of the touch panel is a circle or an ellipse, an original point of a two-axis coordinate system is at a corner of a rectangle encloses the circle or the ellipse, wherein two opposite edges of the rectangle meet edges of the touch panel.

Preferably, in order to simplify design complexity and to reduce required computing resource, wherein the touch panel comprises multiple first electrodes in parallel to a first axis and multiple second electrodes in parallel to a second axis, a shape of the touch panel is an ellipse, a major and a minor axes of the ellipse are in parallel to the first and the second axes, respectively.

Preferably, in order to let multiple touch electrodes have similar resistance characteristics, the touch panel comprises multiple first electrodes in parallel to a first axis and multiple second electrodes in parallel to a second axis, each of the first and the second electrodes connects to a touch sensitive processing apparatus via a wire, wherein at least two of the wires made by same material have different widths and lengths.

Preferably, in order to apply angular coordinates in gesture recognition, wherein the approximating or touching position being reported to the host is represented by angular coordinates, wherein the angular coordinates are corresponding to a center of the non-report area and a direction in parallel to a touch electrode of the touch panel.

Preferably, in order to apply angular coordinates in gesture recognition, wherein the approximating or touching position being reported to the host is represented by angular coordinates, wherein the angular coordinates are corresponding to a center of the report area and a direction in parallel to a touch electrode of the touch panel.

According to an embodiment of the present application, a touch sensitive processing apparatus for connecting to a touch panel is provided. The touch sensitive processing apparatus comprising: an interconnection network for connecting multiple touch electrodes of the touch panel; a driving circuit for connecting to the interconnection network; a sensing circuit for connecting to the interconnection network; and a processor configured for executing instructions stored in a non-volatile memory to realize: having the interconnection network, the driving circuit and the sensing circuit performing capacitance sensing by the touch electrodes to gather an approximating or touching position of an external conductive object with regard to the touch panel; determining whether the approximating or touching position is within a non-report area, wherein a shape of the non-report area is a circle or an ellipse; when the approximating or touching position is determined outside the non-report area, reporting the approximating or touching position to a host; and when the approximating or touching position is determined inside the non-report area, ignoring the approximating or touching position.

Preferably, in order to provide an annulus report area on a rectangular touch panel, when the approximating or touching position is outside the non-report area, the processor is further configured to realize: determining whether the approximating or touching position is within a report area, wherein the report area includes the non-report area, and a shape of the report area is a circle or an ellipse; when the approximating or touching position is within the report area, reporting the approximating or touching position to the host; when the approximating or touching position is outside the report area, ignoring the approximating or touching position.

Preferably, in order to quickly determining whether the approximating or touching position is required to be reported to the host for saving computing resources or memory resources to record the position of the non-report area and to determine whether the approximating or touching position is within the non-report area, when the shape of the non-report area is a circle, the determining whether the approximating or touching position is within a non-report area comprises calculating a first function value $(x-Cx)^2+(y-Cy)^2$, where coordinates of the approximating or touching position are (x, y), a center of the non-report area is at (Cx, Cy); calculating a square value of a radius of the non-report area; comparing the first function value with the square value of the radius of the non-report area; when the first function value is larger than the square value, it is determined that the approximating or touching position is outside the non-report area; and when the first function value is smaller than the square value, it is determined that the approximating or touching position is within the non-report area, when the shape of the non-report area is an ellipse, the determining whether the approximating or touching position is within a non-report area comprises calculating a second function value $(x-Cx)^2/a^2+(y-Cy)^2/b^2$, where a length of one of the major and the minor axes in parallel to an axis "x" is "a" and a length of another one of the major and the minor axes in parallel to an axis "y" is "b"; comparing the second function value with 1; when the second function value is larger than 1, it is determined that the approximating or touching position is outside the non-report area; and when the second function value equals to or less than 1, it is determined that the approximating or touching position is within the non-report area.

Preferably, in order to quickly determining whether the approximating or touching position is required to be reported to the host for saving computing resources or memory resources to record the position of the report area and to determine whether the approximating or touching position is within the report area, when the shape of the report area is a circle, the determining whether the approximating or touching position is within a report area comprises: calculating a first function value $(x-Cx)^2+(y-Cy)^2$, where coordinates of the approximating or touching position are (x, y), a center of the report area is at (Cx, Cy); calculating a square value of a radius of the report area; comparing the first function value with the square value of the radius of the report area; when the first function value is larger than the square value, it is determined that the approximating or touching position is outside the report area; and when the first function value is smaller than the square value, it is determined that the approximating or touching position is within the report area, when the shape of the non-report area is an ellipse, the determining whether the approximating or touching position is within a report area comprises calculating a second function value $(x-Cx)^2/a^2+(y-Cy)^2/b^2$, where a length of one of the major and the minor axes in parallel to an axis "x" is "a" and a length of another one of the major and the minor axes in parallel to an axis "y" is "b"; comparing the second function value with 1; when the second function value is larger than 1, it is determined that the approximating or touching position is outside the report area; and when the second function value equals to or less than 1, it is determined that the approximating or touching position is within the report area.

Preferably, in order to provide asymmetric and annulus touch sensitive area, wherein a center of the report area is not at a center of the non-report area.

Preferably, in order to utilize non-rectangular touch panel, wherein a shape of the touch panel is a circle or an ellipse, an original point of a two-axis coordinate system is at a corner of a rectangle encloses the circle or the ellipse, wherein two opposite edges of the rectangle meet edges of the touch panel.

Preferably, in order to simplify design complexity and to reduce required computing resource, wherein the touch panel comprises multiple first electrodes in parallel to a first axis and multiple second electrodes in parallel to a second axis, a shape of the touch panel is an ellipse, a major and a minor axes of the ellipse are in parallel to the first and the second axes, respectively.

Preferably, in order to let multiple touch electrodes have similar resistance characteristics, the touch panel comprises multiple first electrodes in parallel to a first axis and multiple second electrodes in parallel to a second axis, each of the first and the second electrodes connects to a touch sensitive processing apparatus via a wire, wherein at least two of the wires made by same material have different widths and lengths.

Preferably, in order to apply angular coordinates in gesture recognition, wherein the approximating or touching position being reported to the host is represented by angular coordinates, wherein the angular coordinates are corresponding to a center of the non-report area and a direction in parallel to a touch electrode of the touch panel.

Preferably, in order to apply angular coordinates in gesture recognition, wherein the approximating or touching position being reported to the host is represented by angular coordinates, wherein the angular coordinates are corresponding to a center of the report area and a direction in parallel to a touch electrode of the touch panel.

According to an embodiment of the present application, an electronic system with touch sensitive function comprising aforementioned touch sensitive processing apparatus and touch panel.

According to an embodiment of the present application, a touch panel is provided. A shape of the touch panel is a circle or an ellipse. The touch panel comprising multiple first electrodes in parallel to a first axis and multiple second electrodes in parallel to a second axis, each of the first and the second electrodes is connected to a touch sensitive processing apparatus via a wire, wherein at least two of the wires made by same material have different widths and lengths.

The touch panel and its associated touch sensitive processing method, apparatus and electronic systems have annulus touch sensitive areas for specific applications. Annulus touch gestures may be applied to multiple scenarios such as digital knob simulation, angle setting etc. The present application may not need to record coordinates of the non-report area and coordinates outside of the report area. Hence memory space may be saved. Because it does not need to compare with the coordinates, computing resources for comparison may be saved. Accordingly, memory resource and computing resource can be reduced and so does execution time.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Figure 1:
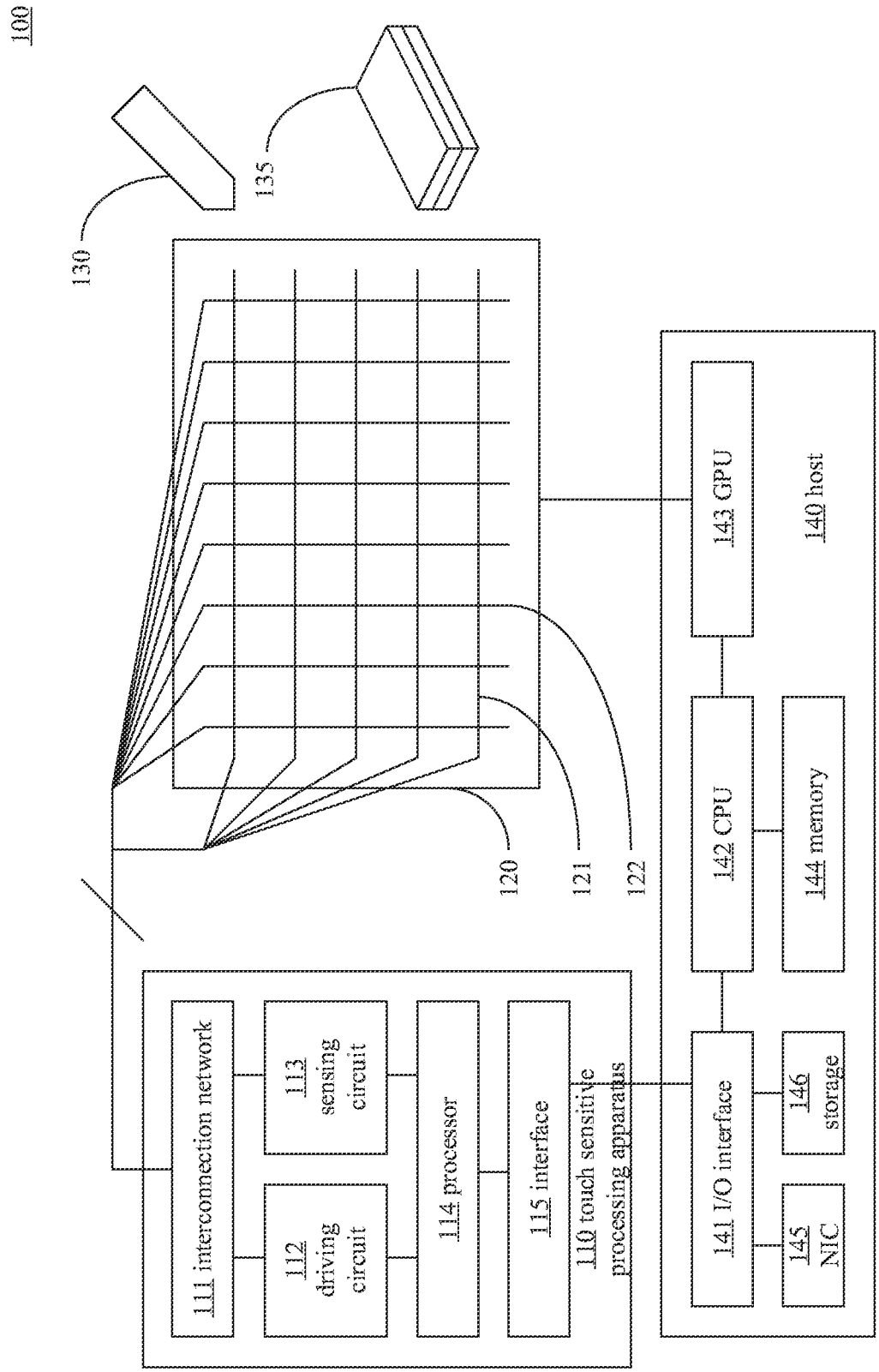
FIG. 1 depicts a touch system 100 in accordance with an embodiment of the present application.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1, which depicts a touch system 100 in accordance with an embodiment of the present application. The touch system 100 may be a computer system such as a desktop computer, a laptop computer, a tablet computer, an industrial control computer, a smartphone or any other kinds of computer having touch sensitive function.

The touch system 100 may comprise a touch sensitive processing apparatus 110, a touch panel or screen 120 coupled to the touch sensitive processing apparatus, and a host 140 coupled to the touch sensitive processing apparatus. The touch system 100 may further comprises one or more styli 130 and/or touch board eraser 135. Hereinafter the touch panel or screen 120 is referred as the touch screen 120. However, in the embodiments lacking of display function, persons having ordinary skill in the art can understand the touch screen denoted in the present application may be referred to a touch panel.

The touch screen 120 may comprise multiple first electrodes 121 in parallel to a first axis and multiple second electrodes 122 in parallel to a second axis. The first electrodes 121 may intersect with the second electrodes 122 in order to form multiple sensing points or sensing areas. Equivalently, the second electrodes 122 may intersect with the first electrodes 121 in order to form multiple sensing points or sensing areas. In some embodiments of the present application, the first electrodes 121 may be referred as first touch electrodes 121 and the second electrodes 122 may be referred as second touch electrodes 122. The first electrodes 121 and the second electrodes 122 may be collectively referred as touch electrodes. In some embodiments with touch screens 120, the first electrodes 121 and the second electrodes 122 are made by transparent material. The first electrodes 121 and the second electrodes 122 may be disposed in one electrode layer. Conductive plates of each one of the first electrodes 121 or the second electrodes 122 may be connected by bridging. The first electrodes 121 and the second electrodes 122 may be disposed at different overlapping electrode layers. Unless described specifically, the present application may be applied to the embodiments having one or more electrode layers. The first axis and the second axis are perpendicular in most cases. However, the present application does not limit that the first axis and the second axis are perpendicular. In one embodiment, the first axis may be a horizontal axis or a pixel refreshing axis of the touch screen 120.

The touch sensitive processing apparatus 110 may comprise following hardware circuit: an interconnection network module 111, a driving circuit module 112, a sensing circuit module 113, a processor module 114, and an interface module 115. The touch sensitive processing apparatus 110 may be implemented inside a single integrated circuit which may include one or more chips. It may use multiple integrated circuits and an interconnected circuit board carried the multiple integrated circuits to realize the touch sensitive processing apparatus 110. The touch sensitive processing apparatus 110 may be implemented in single integrated circuits with the host 140. The present application does not limit how to implement the touch sensitive processing apparatus 110.

The interconnection network module 111 is configured to connect each of the multiple first electrodes 121 and/or the multiple second electrodes 122 of the touch screen 120. The interconnection network module 111 may follow control command of the processor module 114 for connecting the driving circuit module 112 and any one or more touch electrodes and for connecting the sensing circuit module 113 and any one or more touch electrodes. The interconnection network module 111 may include a combination of one or more multiplexers (MUX) to realize the aforementioned functions.

The driving circuit module 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 111 according to control commands of the processor module 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 112 may include one or more channel. Each channel may be connected to any one or more touch electrodes via the interconnection network module 111.

The sensing circuit module 113 may comprise integrator, sampler, clock generator, frequency divider, frequency multiplier, phase lock loop, power amplifier, operational amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 113 may demodulate the induced touch signal by another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. At the same time, each channel may simultaneously perform sensing and demodulation.

In one embodiment, the driving circuit module 112 and the sensing circuit module 113 may include analog front-end (AFE) circuits. In another embodiment, in additional to the AFE circuits, the driving circuit module 112 and the sensing circuit module 113 may include digital back end (DBE) circuits. If the driving circuit module 112 and the sensing circuit module 113 include only the AFE circuits, the DBE circuits may be implemented in the processor module 114.

The processor module 114 may include a digital signal processor for connecting the AFE circuits or the DBE circuits of the driving circuit module 112 and the sensing circuit module 113, respectively. The processor module 114 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the touch sensitive processing apparatus 110. For examples, the processor 114 may comprises processors widely adopted in the industry such as 8051 series, Intel i960 series, ARM Cortex-M series and etc. The present application does not limit types and numbers of processor cores included in the processor module 114.

The instructions and data may be used to implement each of steps mentioned in the present application and flows and methods constructed by the steps. Some instructions may be executed independently inside the processor module 114, for examples, arithmetic and log operation instructions. Other instructions may be used to control other circuits of the touch sensitive processing apparatus 110. These instructions may include input/output interfaces of the processor module 114 to control other circuits. Other circuits may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the circuits and the instructions.

The interface module 115 may include kinds of serial or parallel bus, such as universal serial bus (USB), I$^2$C, peripheral component interconnect (PCI), PCI-Express, IEEE 1394 and other industrial standard input/output interface. The touch sensitive processing apparatus 110 connects to the host 140 via the interface module 115.

The touch system 100 may comprise one or more styli 130 and/or touch board erasers 135. The stylus 130 and touch board eraser 135 may be transmitters which emit electrical signals. The transmitters may include active transmitter which actively emits electrical signals or passive transmitters which emit electrical signals in response to external electrical signals. The stylus 130 and touch board eraser 135 may comprise one or more electrodes which is configured to receive electrical signals from the touch screen 120 synchronously or asynchronously, or to transmit electrical signals to the touch screen 300, 400 or 600 synchronously or asynchronously. The electrical signals may be modulated according to one or more of the aforementioned modulation methods.

The stylus 130 or touch board eraser 135 may be conductor which is configured to transmit driving signals or to be grounded via user's hand or body. The stylus 130 or touch board eraser 135 may be physically or wirelessly connected to an I/O interface 141 of the host 140 or any other interfacing circuits of the I/O interface 141.

The touch sensitive processing apparatus 110 may detect one or more external objects such as fingers, palms or passive styli 130 or touch board erasers 135, or active styli 130 or touch board erasers 135 emitting electrical signals via the touch screen 120. The touch sensitive processing apparatus 110 may utilize mutual-capacitance sensing or self-capacitance sensing to detect external conductive objects. The styli 130 or touch board erasers 135 and touch sensitive processing apparatus 110 may use the aforementioned modulation and demodulation methods to transmit message via the electrical signals. The touch sensitive processing apparatus 110 may detect one or more positions where the styli 130 or touch board erasers 135 touch or approach the touch screen 120, status or sensors (pressure sensor or button) onboard the stylus 130 or touch board eraser 135, orientation angle or inclination angle of the stylus 130 or touch board eraser 135 with respect to the touch screen 120 etc. according to the electrical signals.

The host 140 is a main apparatus for controlling the touch system 100. It may comprise an input/output interface module 141 for connecting the interface module 115, a central processing unit (CPU) module 142, a graphics processor module 143, a memory module 144 connects to the CPU module 142, a network interface module 145 and a storage 146 module connect to the input/output interface module 141.

The storage module 146 comprises non-volatile memory. Common examples are hard disks, electronic erasable rewritable read only memory (EEPROM), or flash memory. The storage module 146 may store normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and the storage module 146. The CPU module 142 may comprise one or more processor or processor cores. Common processors may include Intel, AMD, VIA's x86 and x64 instruction set architecture (ISA) processors, Apple, Qualcomm, MediaTek's ARM ISA processors, or any other types of complex instruction set computer (CISC) or reduced instruction set computer (RISC) processors. The OS and application programs include multiple instructions and data corresponding to the instruction set. By executing these instructions, the CPU module 742 is able to control other circuits of the touch system 100.

The optional graphics processor (GPU) module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware circuits. Persons having ordinary skill in the art should have common knowledge of computer organization and architecture. They can understand the touch system 100 disclosed by the present application is exemplary. Parts regarding to the inventive feature provided by the present application should be referred to the specification and the claim.

Figure 2:
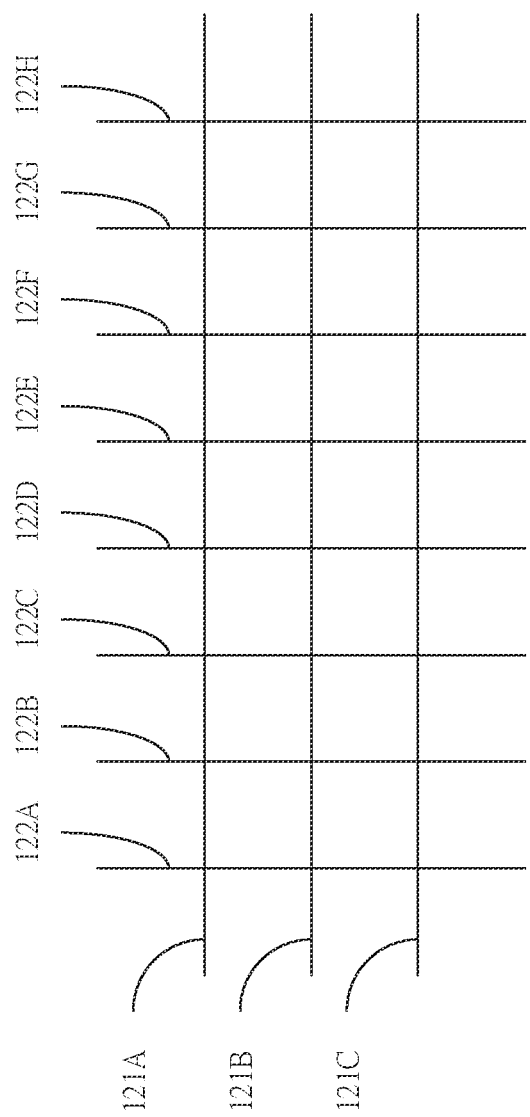
FIG. 2 depicts a touch screen in accordance with an embodiment of the present application.

Please refer to FIG. 2, which depicts a touch screen in accordance with an embodiment of the present application. For convenience, the touch screen 120 includes only three first electrodes 121. Sequentially, they are first electrodes 121A, 121B, and 121C, respectively. The touch screen 120 includes multiple second electrodes 122A-122H.

In mutual-capacitance sensing, the driving circuit module 112 would provide driving signals to each of the three first electrodes 121 in a time-sharing manner. When the driving signals being provided, the sensing circuit module 113 is commanded to simultaneously sense all the second electrodes 122 in three times to gather three one-dimensional arrays of sensing information. Each of the one-dimensional arrays includes sensing information with respect to each of the second electrodes 122. According to the sequence of first electrodes emitting the driving signals, the three one-dimensional arrays can form a two-dimensional array of sensing information or a so-called sensing image. According to the two-dimensional array or the sensing image, the processor module 114 can detect whether an external conductive object approaching or touching the touch screen 120.

In one embodiment, the outputs of the sensing circuit module 113 are sensing information with respect to each of the second electrodes 122. In another embodiment, the outputs of the sensing circuit module 113 are difference values of sensing information with respect to two adjacent second electrodes 122. Each element of the one-dimensional array is a difference value. Because interference is usually occurred in locality, interference signals to two adjacent electrodes may not differ too much. Hence, utilizing difference values of two adjacent second electrodes 122 may eliminate sensing values caused by most of interferences.

In an alternative embodiment, the outputs of the sensing circuit module 113 are dual difference values of sensing information with respect to three consecutive second electrodes 122. For examples, a first difference value between sensing information of the second electrodes 122B and 122A can be calculated. A second difference value between sensing information of the second electrodes 122C and 122B can be calculated. Thus, the dual difference value is a difference between the first and the second difference values. Each element of the one-dimensional array is a dual difference value. Similarly, because interference is usually occurred in locality, interference signals to two adjacent electrodes may not differ too much. Hence, utilizing difference values of three consecutive second electrodes 122 may eliminate sensing values caused by most of interferences. By utilizing a two-dimensional array or a sensing image of sensing information composed by difference values or dual difference values can have better interference-resistant sensing result.

Figure 3:
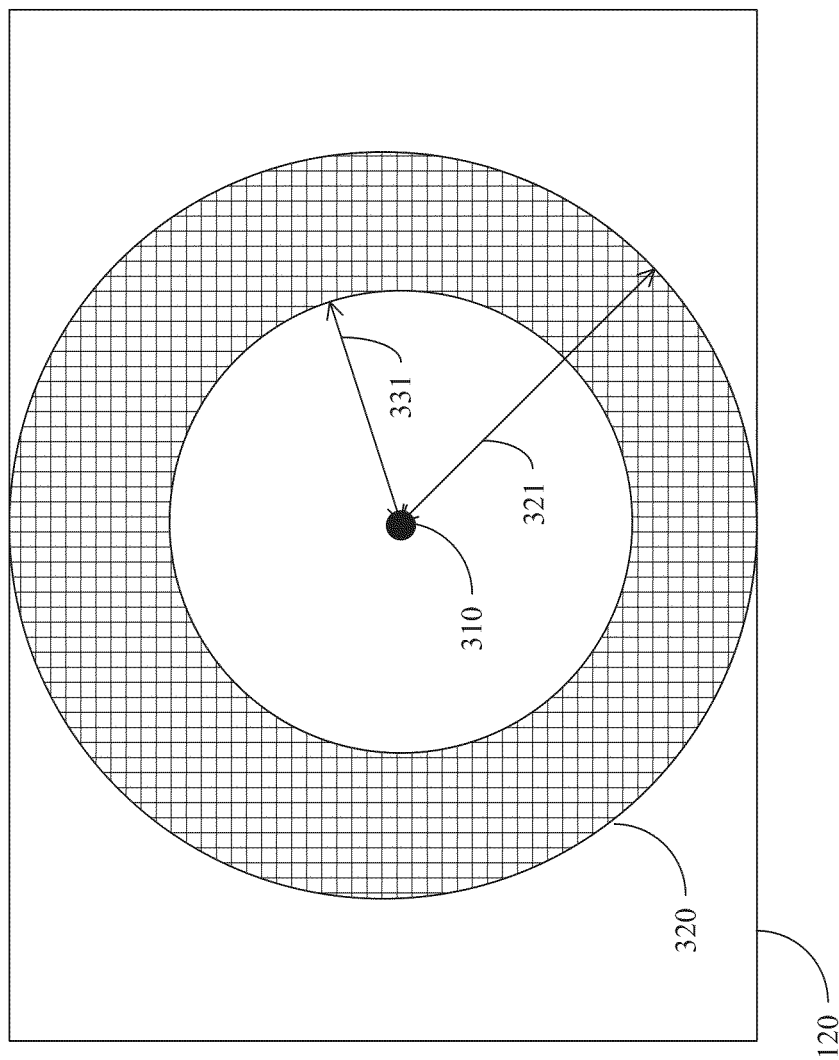
FIG. 3 depicts a diagram of an annulus touch sensitive area in accordance with an embodiment of the present application.

Please refer to FIG. 3, which depicts a diagram of an annulus touch sensitive area in accordance with an embodiment of the present application. The embodiment is applicable to the touch panel or touch screen 120 as shown in FIGS. 1 and 2. The annulus touch sensitive area is resided between two concentric circles. These two concentric circles share a common center 310. The circumference 320 of the larger concentric circle is aligned to two opposite edges of the touch panel or screen 120. However, the present application does not require that the circumference is aligned to the opposite edges. The radius 321 of the larger concentric circle is larger than the radius 331 of the smaller concentric circle.

Figure 10:
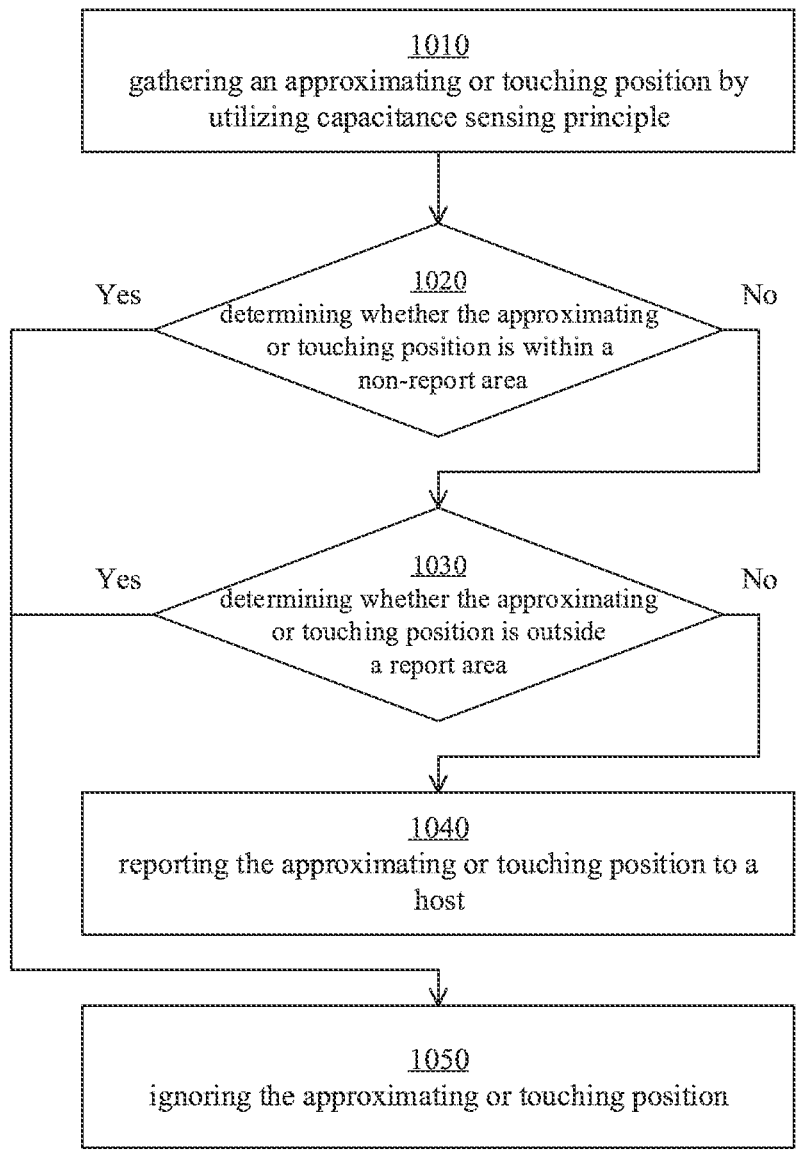
FIG. 10 depicts a flowchart diagram of a touch sensitive processing method applicable to the embodiment as shown in FIG. 3.

Please refer to FIG. 10, which depicts a flowchart diagram of a touch sensitive processing method applicable to the embodiment as shown in FIG. 3. The touch sensitive processing method is applicable to the touch sensitive processing apparatus 110 as shown in FIG. 1. Especially, the processor module 114 may be used to execute instructions stored in a non-volatile memory to fulfill the method. The touch sensitive processing method may begin at step 1010.

Step 1010: gathering an approximating or touching position by utilizing capacitance sensing principle. According to self-capacitance or mutual-capacitance sensing principles, person having ordinary skill in the art can understand that through the first electrodes 121, the second electrodes 122, the interconnection network module 111, the driving circuit module 112, and the sensing circuit module 113, an approximating or touching position of the touch panel or screen 120 corresponding to an external conductive object can be gathered. The approximating or touching position is represented by coordinates of a horizontal axis and a vertical axis, e.g., (x, y). One corner of the touch panel or screen 120 may be used as an original point, which is represented as (0, 0).

Step 1020: determining whether the approximating or touching position is within a non-report area. In the embodiment as shown in FIG. 3, the non-report area is the smaller concentric circle with the radius 331 to the center of the circle (Cx, Cy). In the embodiment as shown in FIG. 3, the non-report area is a circular area. However, in other embodiments of the present application, the non-report area may be an oval area, a rectangular area, or any other shapes of area. When the result of the determination is positive, the flow proceeds to step 1050. Otherwise, the flow proceeds to step 1030.

Step 1030: determining whether the approximating or touching position is outside a report area. In the embodiment as shown in FIG. 3, the report area is the larger concentric circle with the radius 321 to the center of the circle (Cx, Cy). The report area completely includes the non-report area. Hence, the touch sensitive processing method as shown in FIG. 10 first exclude the smaller non-report area, then exclude rest area other than the report area. In the embodiment as shown in FIG. 3, the report area is a circular area. However, in other embodiments of the present application, the report area may be an oval area, a rectangular area, or any other shapes of area. When the result of the determination is positive, the flow proceeds to step 1050. Otherwise, the flow proceeds to step 1040.

Step 1040: reporting the approximating or touching position to a host. In the embodiment as shown in FIG. 1, the touch sensitive processing apparatus 110 may transmit a message contains the approximating or touching position to the input/output interface 141 of the host 140 via the interface module 115 for indicating that an external conductive object approximating or touching the annulus touch sensitive area marked with cross pattern as shown in FIG. 3. In one embodiment, the approximating or touching position being reported to the host 140 is represented by coordinates corresponding to the horizontal and the vertical axes such as (x, y) format. In another embodiment, the step 1040 may be implemented as reporting the position represented in an angular coordinate format (r, θ) to the host 140. The r in the angular coordinate format represent a distance between the approximating or touching position and the center of the circle 310, and the θ represents an angle between a line through the center of the circle to the approximating or touching position and a base line originated from the center of the circle. In other words, the angle is between 0~360 degree or between 0~2π.

Step 1050: ignoring the approximating or touching position. Because the approximating or touching position is not in the annulus touch sensitive area marked in cross patterns, the touch sensitive processing apparatus 110 does not report the approximating or touching position to the host 140.

Figure 11:
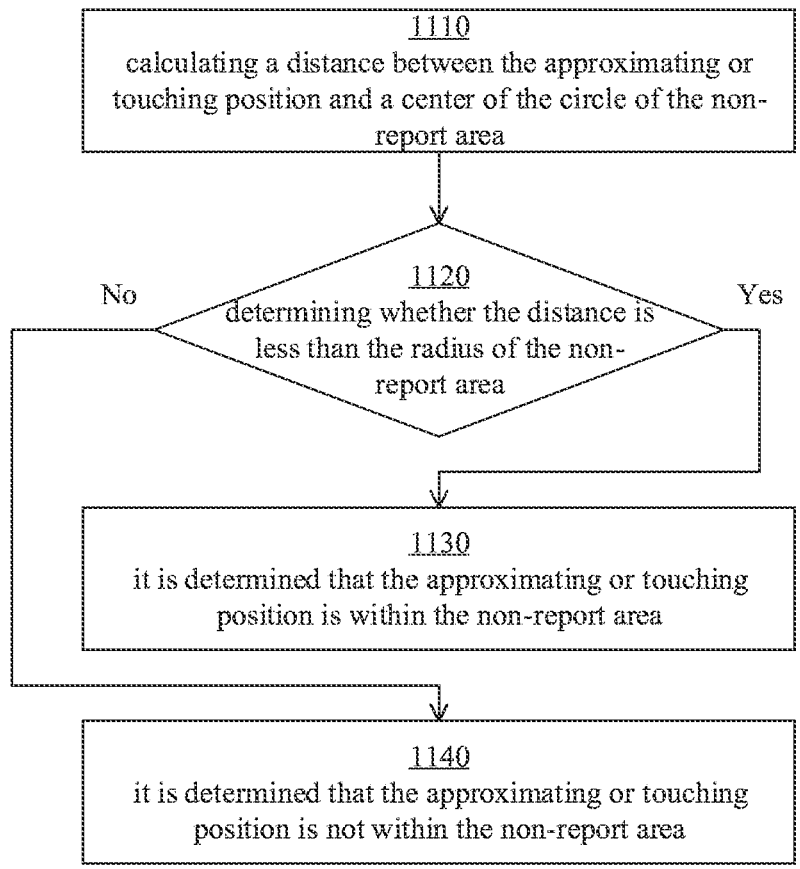
FIG. 11 depicts a flowchart diagram of the step 1020 as shown in FIG. 10.

Please refer to FIG. 11, which depicts a flowchart diagram of the step 1020 as shown in FIG. 10. The implementation constrains of the flowchart as shown in FIG. 11 may be identical to the implementation constrains of the flowchart as shown in FIG. 10.

Step 1110: calculating a distance between the approximating or touching position and a center of the circle of the non-report area. Assuming the coordinates of the approximating or touching position are represented as (x, y) and the center of circle is at (Cx, Cy), the distance may be a square root of $(Cx-x)^2+(Cy-y)^2$ or a square root of $(x-Cx)^2+(y-Cy)^2$. Since the computing of square root costs more computing resources, in one example, the computation of square root may be skipped, only two square values are calculated.

Step 1120: determining whether the distance is less than the radius of the non-report area. In the example above, this step compares the square value of the distance with a square value of the radius to determine whether the square value of the distance is less than the square value of the radius. When the distance is less than the radius of the non-report area or when the square value of the distance is less than the square value of the radius, the flow proceeds to step 1130. Otherwise, the flow proceeds to step 1140.

Step 1130: it is determined that the approximating or touching position is within the non-report area.

Step 1140: it is determined that the approximating or touching position is not within the non-report area.

Figure 12:
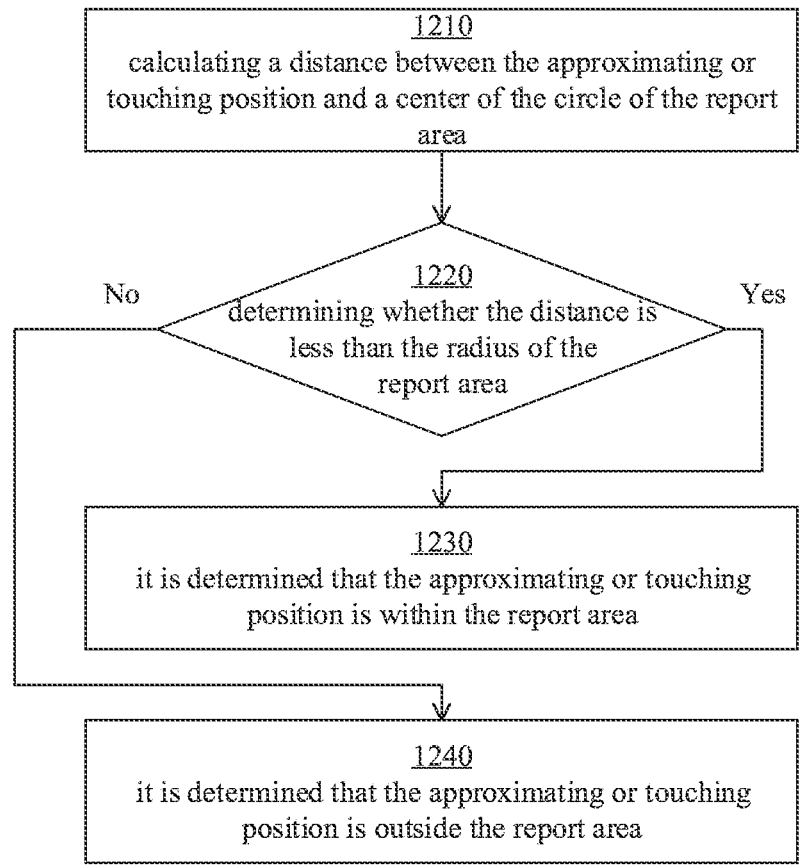
FIG. 12 depicts a flowchart diagram of the step 1030 as shown in FIG. 10.

Please refer to FIG. 12, which depicts a flowchart diagram of the step 1030 as shown in FIG. 10. The implementation constrains of the flowchart as shown in FIG. 12 may be identical to the implementation constrains of the flowchart as shown in FIG. 10.

Step 1210: calculating a distance between the approximating or touching position and a center of the circle of the report area. Assuming the coordinates of the approximating or touching position are represented as (x, y) and the center of circle is at (Cx, Cy), the distance may be a square root of $(Cx-x)^2+(Cy-y)^2$ or a square root of $(x-Cx)^2+(y-Cy)^2$. Since the computing of square root costs more computing resources, in one example, the computation of square root may be skipped, only two square values are calculated.

Step 1220: determining whether the distance is less than the radius of the report area. In the example above, this step compares the square value of the distance with a square value of the radius to determine whether the square value of the distance is less than the square value of the radius. When the distance is less than the radius of the non-report area or when the square value of the distance is less than the square value of the radius, the flow proceeds to step 1230. Otherwise, the flow proceeds to step 1240.

Step 1230: it is determined that the approximating or touching position is within the report area.

Step 1240: it is determined that the approximating or touching position is outside the report area.

Figure 4:
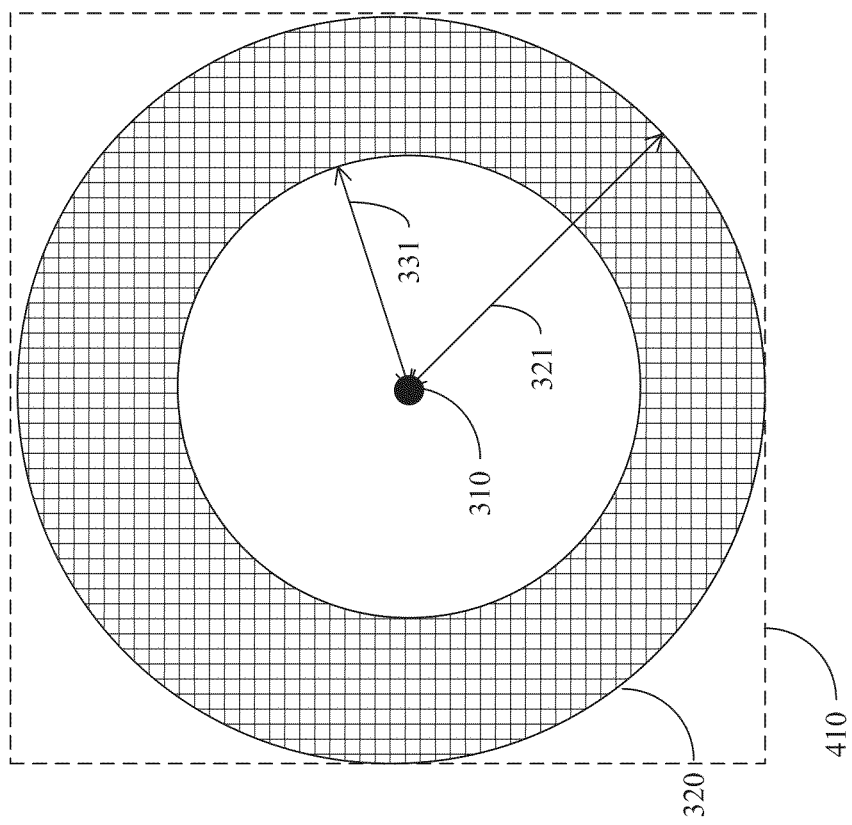
FIG. 4 depicts a diagram of an annulus touch sensitive area in accordance with an embodiment of the present application.

Please refer to FIG. 4, which depicts a diagram of an annular touch sensitive area in accordance with an embodiment of the present application. Similar to the embodiment as shown in FIG. 3, the annulus touch sensitive area is marked by cross patterns. The annulus touch sensitive area is constituted by an area in between two concentric circles. These two concentric circles share a common center of circle 310. The radius 321 of the larger concentric circle is larger than the radius 331 of the smaller concentric circle.

The difference between the present embodiment and the embodiment as shown in FIG. 3 is that the annulus touch sensitive area resides in a circular shape of touch panel or screen 420. Similarly, the touch panel or screen 420 contains multiple first electrodes in parallel to a first axis and multiple second electrodes in parallel to a second axis. These first electrodes intersect with the second electrodes. All of the first and the second electrodes cross or cut the touch panel or screen 420. A center of the touch panel locates in the center of circle 310. A circumference 320 of the larger concentric circle is the edge of the touch panel or screen 420. The circular shape of the touch panel or screen 420 can be enclosed by a square shape 410 which represents its coordinate system of the approximating or touching position.

Figure 15:
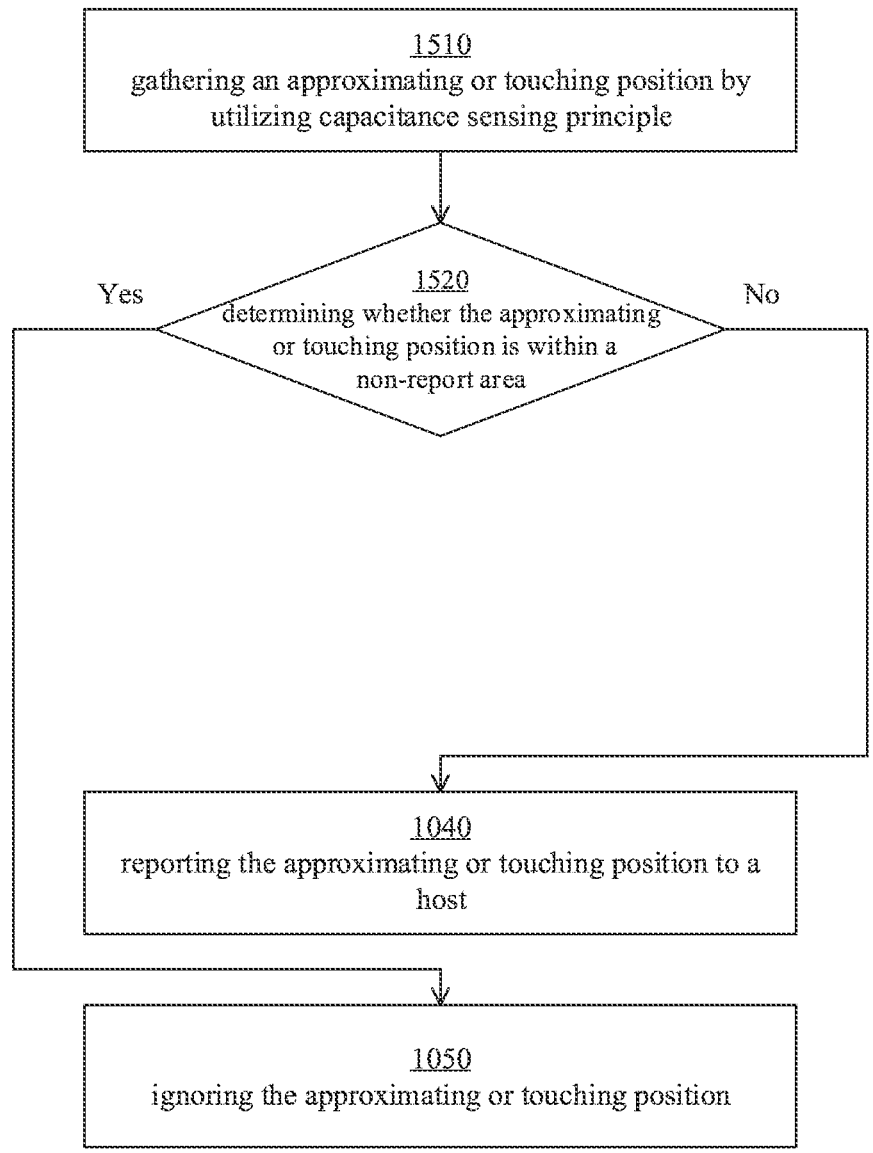
FIG. 15 depicts a flowchart diagram of a touch sensitive processing method applicable to the touch panel or screen as shown in FIG. 4 or FIG. 8.

Please refer to FIG. 15, which depicts a flowchart diagram of a touch sensitive processing method applicable to the touch panel or screen 420 as shown in FIG. 4. The touch sensitive processing method may be applicable to the touch sensitive processing apparatus 110 as shown in FIG. 1. Especially, the processor module 114 may be used to execute instructions stored in a non-volatile memory to fulfill the method. The touch sensitive processing method may begin at step 1510.

Step 1510: gathering an approximating or touching position by utilizing capacitance sensing principle. According to self-capacitance or mutual-capacitance sensing principles, person having ordinary skill in the art can understand that through the first electrodes 121, the second electrodes 122, the interconnection network module 111, the driving circuit module 112, and the sensing circuit module 113, an approximating or touching position of the touch panel or screen 120 corresponding to an external conductive object can be gathered. The approximating or touching position is represented by coordinates of a horizontal axis and a vertical axis, e.g., (x, y).

The shape of the touch panel or screen 420 is a circle, which is enclosed by a square shape. One corner of the square shape may be used as an original point, which is represented as (0, 0). Because there is no first electrodes and second electrodes at the position (0, 0), it cannot detect any external conductive object at the coordinates (0, 0). In other words, it cannot detect any external conductive object at positions where no existing first and second electrodes. Hence, the approximating or touching position gathered in the present step 1510 is certainly within the touch panel or screen 420. Therefore, the touch sensitive processing method does not need to exclude any positions outside the larger concentric circle.

Step 1520: determining whether the approximating or touching position is within a non-report area. When the determination result is positive, the flow proceeds to step 1050. Otherwise, when the determination result is negative, the flow proceeds to step 1040. The step 1520 may be implemented as the embodiment as shown in FIG. 11.

Figure 5:
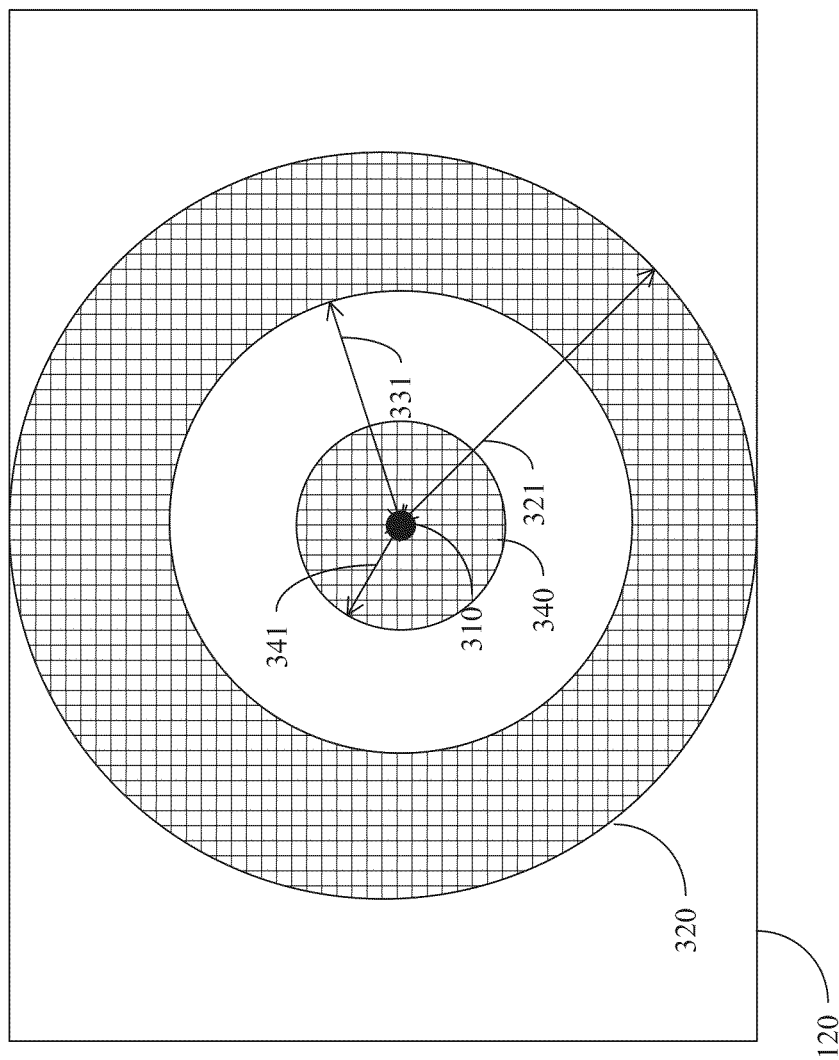
FIG. 5 depicts a diagram of two touch sensitive areas in accordance with an embodiment of the present application.

Please refer to FIG. 5, which depicts a diagram of two touch sensitive areas in accordance with an embodiment of the present application. Identical to the embodiment as shown in FIG. 3, the two touch sensitive areas are marked by cross patterns. The first touch sensitive area is a circle, the second touch sensitive area is an annulus touch sensitive area as shown in FIG. 3. The first touch sensitive area is called a first report area. The second touch sensitive area is called a second report area. The first touch sensitive area is a circle with a radius 341 to a center of circle 310. The second touch sensitive area resides in between two concentric circles. These two concentric circles share a common center of circle 310. The radius 321 of the larger concentric circle is larger than the radius 331 of the smaller concentric circle. A non-report area resides between these two touch sensitive areas which are two report areas. The area outside the circumference 320 is also a non-report area.

Figure 16:
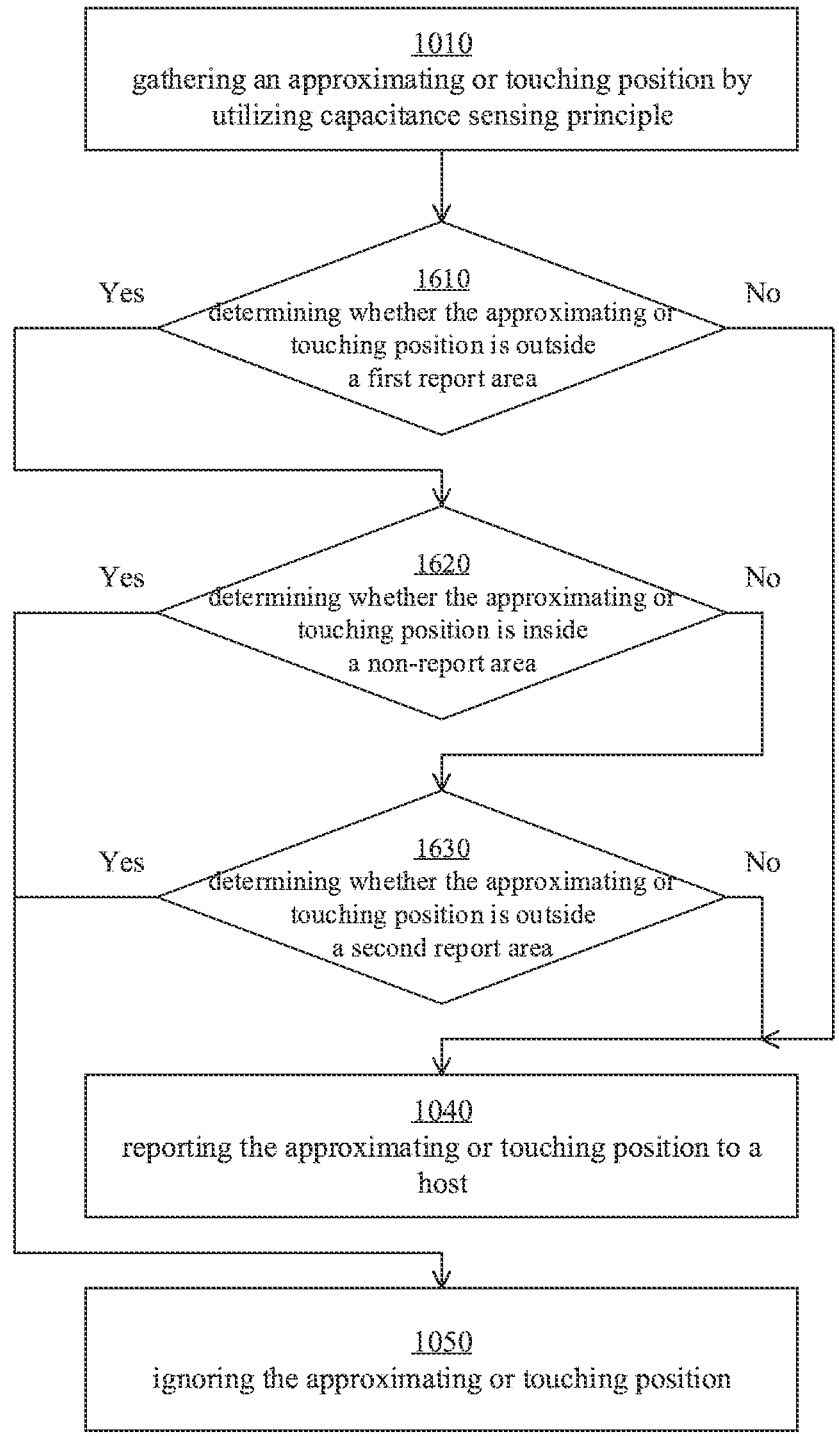
FIG. 16 depicts a flowchart diagram of a touch sensitive processing method applicable to the touch panel or screen 120 as shown in FIG. 5.

Please refer to FIG. 16, which depicts a flowchart diagram of a touch sensitive processing method applicable to the touch panel or screen 120 as shown in FIG. 5. The touch sensitive processing method may be applicable to the touch sensitive processing apparatus 110 as shown in FIG. 1. Especially, the processor module 114 may be used to execute instructions stored in a non-volatile memory to fulfill the method. The touch sensitive processing method may begin at step 1010. After the step 1010, the flow proceeds to step 1610.

Step 1610: determining whether the approximating or touching position is outside a first report area. When the determination result is negative, the flow proceeds to step 1040. Otherwise, then the determination result is positive, the flow proceeds to step 1620.

Step 1620: determining whether the approximating or touching position is inside a non-report area. When the determination result is negative, the flow proceeds to step 1630. Otherwise, then the determination result is positive, the flow proceeds to step 1050.

Step 1630: determining whether the approximating or touching position is outside a second report area. When the determination result is negative, the flow proceeds to step 1040. Otherwise, then the determination result is positive, the flow proceeds to step 1050.

Because in the embodiment as shown in FIG. 5, the first report area, the non-report area, and the second report area is circular, the implementations of steps 1610~1630 may refer to the descriptions corresponding to FIGS. 11 and 12.

Figure 6:
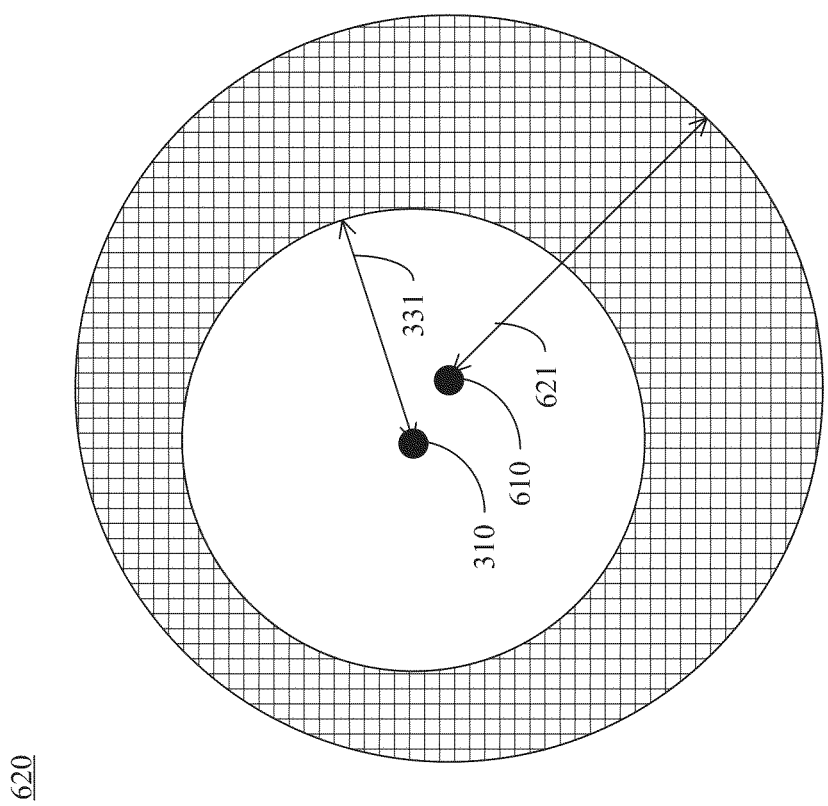
FIG. 6 depicts a diagram of an annulus touch sensitive area in accordance with an embodiment of the present application.

Please refer to FIG. 6, which depicts an annulus touch sensitive area in accordance with an embodiment of the present application. Identical to the embodiment as shown in FIG. 4, the touch panel 620 as shown in FIG. 6 and the touch panel as shown in FIG. 4 are both circles and the center of circle is at a position 610. A difference to the embodiment as shown in FIG. 4 is that a center of a circular non-report area is at a position 310. These two centers of circles are not at one position.

The embodiment as shown in FIG. 10 is also applicable to the touch panel or screen 620 as shown in FIG. 6. However, the center of the non-report area recited at step 1020 is referred to the center of circle 310. The center of the report area recited at step 1030 is referred to the center of circle 610.

Figure 7:
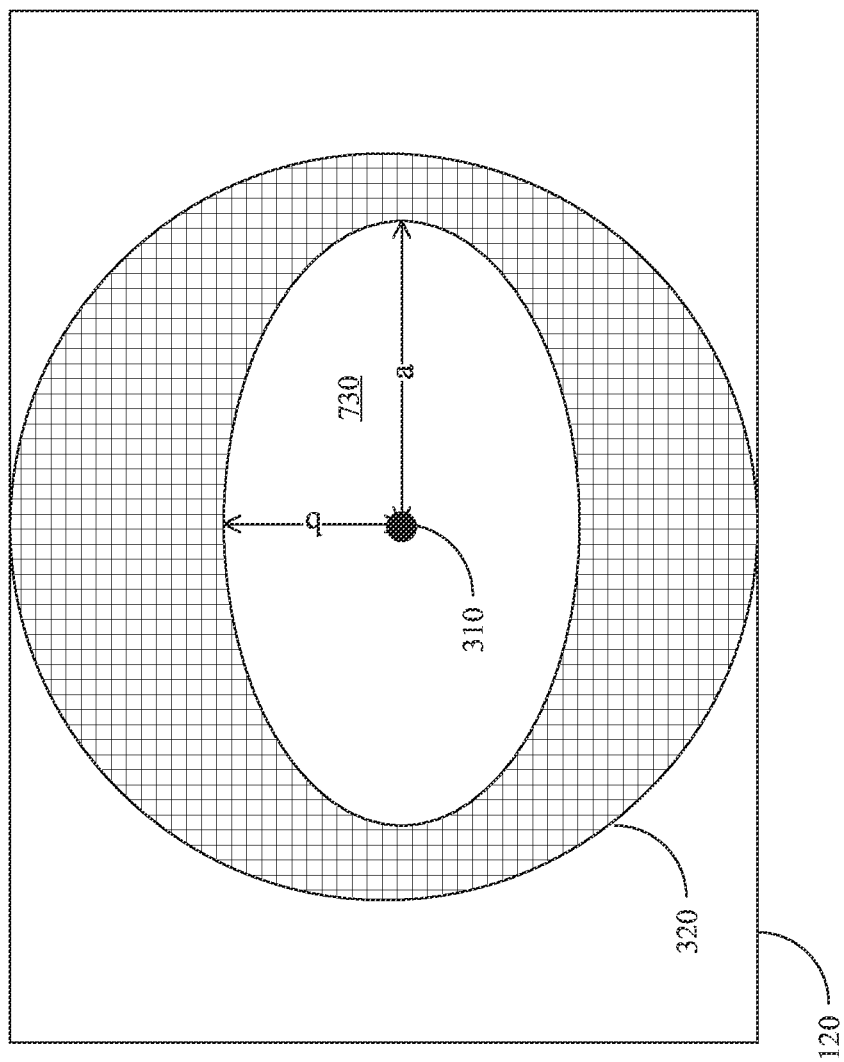
FIG. 7 depicts a diagram of an annulus touch sensitive area in accordance with an embodiment of the present application.

Please refer to FIG. 7, which depicts an annulus touch sensitive area in accordance with an embodiment of the present application. Comparing with the embodiment as shown in FIG. 3, the non-report area of the embodiment as shown in FIG. 7 is an ellipse 730. The center of the ellipse 730 is at the center 310 corresponding to the circumference 320. The ellipse has a major axis with a length "a" and a minor axis with a length "b". The major axis is in parallel to the first electrodes of the touch panel or screen 120. The minor axis is in parallel to the second electrodes of the touch panel or screen 120.

The embodiment as shown in FIG. 10 is also applicable to the touch panel or screen 120 as shown in FIG. 7. The center of the non-report area recited at step 1020 is referred to the center 310 of ellipse 730. The center of the report area recited at step 1030 is referred to the center of circle 310.

Figure 13:
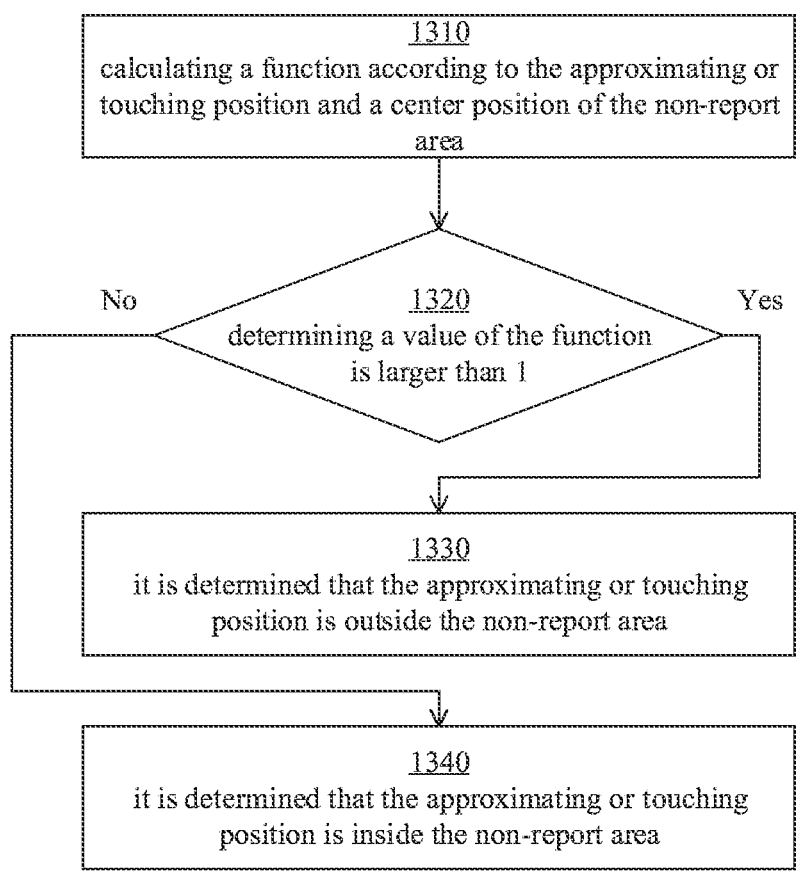
FIG. 13 depicts a flowchart diagram of the step 1020 as shown in FIG. 10.

Please refer to FIG. 13, which depicts a flowchart diagram of the step 1020 as shown in FIG. 10 in accordance with an embodiment of the present application. The implementation constrains of the flowchart as shown in FIG. 13 may be identical to the implementation constrains of the flowchart as shown in FIG. 10. The embodiment as shown in FIG. 13 may begin at step 1310.

Step 1310: calculating a function according to the approximating or touching position and a center position of the non-report area. Assuming the approximating or touching position is at coordinates (x, y) and the center position is at coordinates (Cx, Cy), the function may be calculated as $(x-Cx)^2/a^2+(y-Cy)^2/b^2$.

Step 1320: determining a value of the function is larger than 1. When the function value is larger than 1, the flow proceeds to step 1330. When the function value is not larger than 1, the flow proceeds to step 1340.

Step 1330: it is determined that the approximating or touching position is outside the non-report area.

Step 1340: it is determined that the approximating or touching position is inside the non-report area.

Person having ordinary skill in the art can understand that the ellipse is a round circle if the length of the major axis "a" equals to the length of the minor axis "b" of the ellipse. In other words, the function may be rewritten as $(x-Cx)^2/r^2+(y-Cy)^2/r^2$, where r is the radius of the circle.

Figure 14:
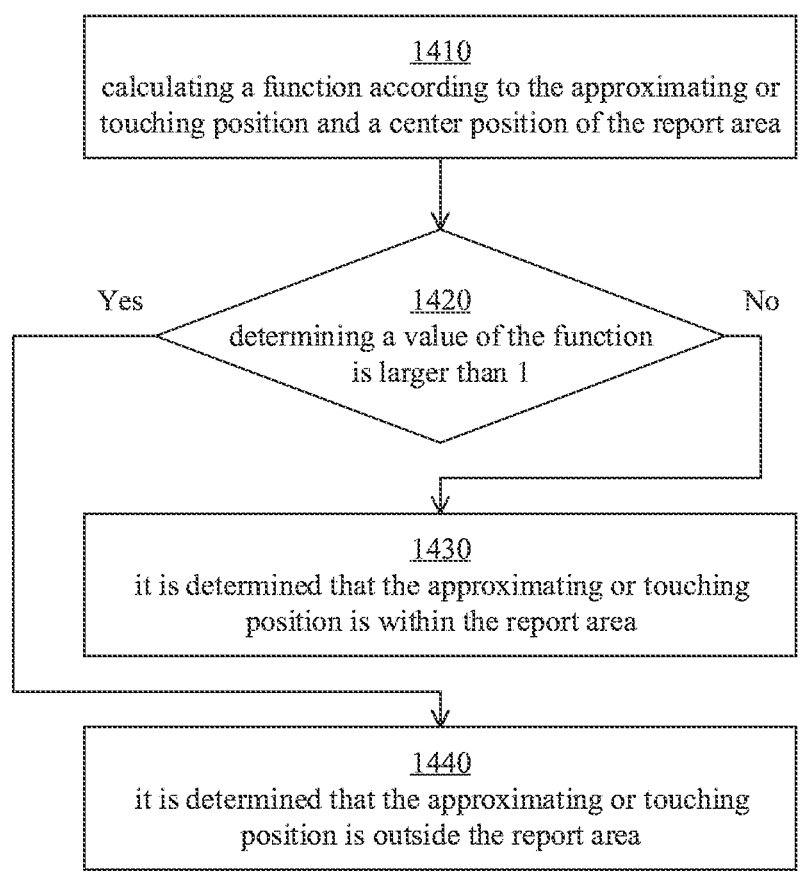
FIG. 14 depicts a flowchart diagram of the step 1030 as shown in FIG. 10.

Please refer to FIG. 14, which depicts a flowchart diagram of the step 1030 as shown in FIG. 10 in accordance with an embodiment of the present application. When the shape of the report area is an ellipse and the major and minor axes are in parallel to the first and the second electrodes, respectively, the embodiment as shown in FIG. 14 is applicable to the step 1030. The implementation constrains of the flowchart as shown in FIG. 14 may be identical to the implementation constrains of the flowchart as shown in FIG. 10. The embodiment as shown in FIG. 14 may begin at step 1410.

Step 1410: calculating a function according to the approximating or touching position and a center position of the report area. Assuming the approximating or touching position is at coordinates (x, y) and the center position is at coordinates (Cx, Cy), the function may be calculated as $(x-Cx)^2/a^2+(y-Cy)^2/b^2$.

Step 1420: determining a value of the function is larger than 1. When the function value is larger than 1, the flow proceeds to step 1430. When the function value is not larger than 1, the flow proceeds to step 1440.

Step 1430: it is determined that the approximating or touching position is within the report area.

Step 1440: it is determined that the approximating or touching position is outside the report area.

Figure 8:
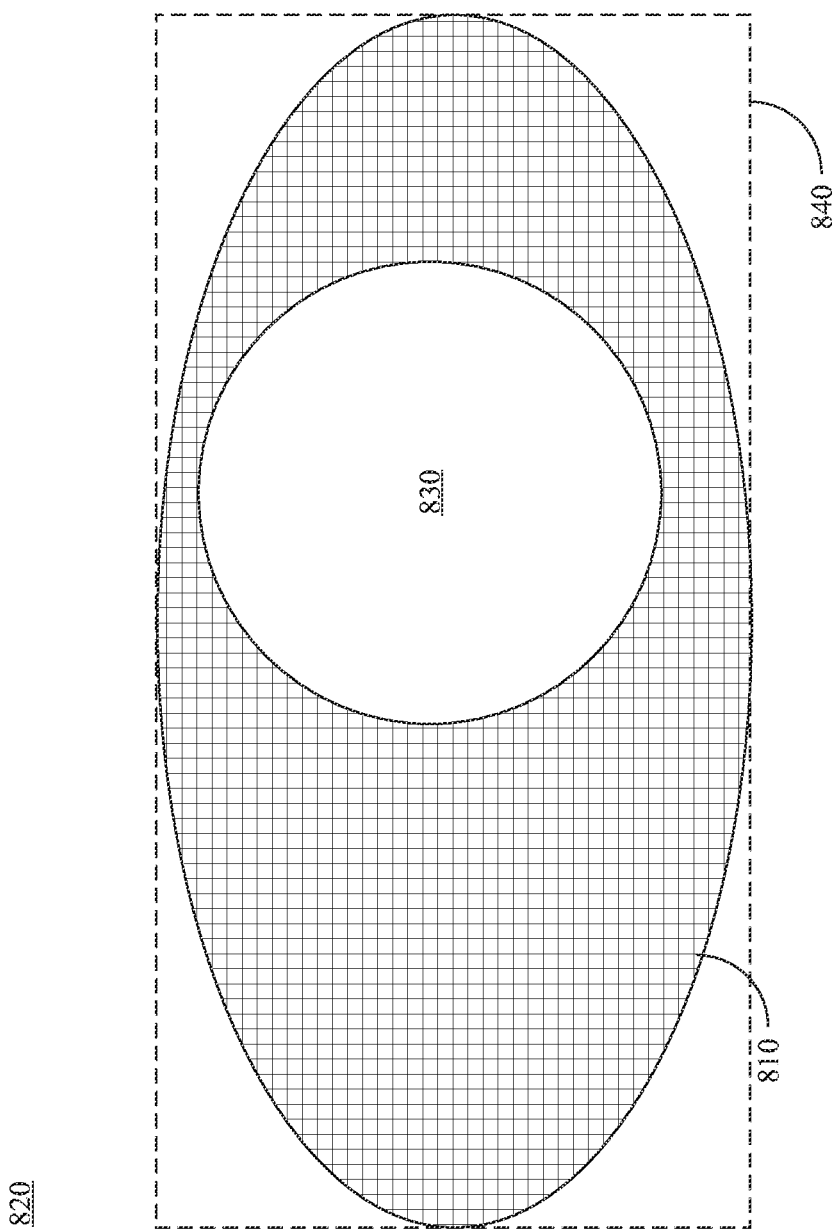
FIG. 8 depicts a diagram of an annulus touch sensitive area in accordance with an embodiment of the present application.

Please refer to FIG. 8, which depicts an annulus touch sensitive area in accordance with an embodiment of the present application. Identical to the embodiment as shown in FIG. 4, the annulus touch sensitive area 810 is on an oval touch panel or screen 820. The touch panel or screen 820 also comprises multiple first electrodes in parallel to the first axis and multiple second electrodes in parallel to the second axis. The first electrodes intersect with the second electrodes. The major and the minor axes of the ellipse may be the first and the second axes, respectively. All of the first and the second electrodes cross or cut the touch panel or screen 820.

The annulus touch sensitive area is marked by cross patterns. The non-report area is a circle 830. And the outer edge of the annulus touch sensitive area 810 is an ellipse. The center of the ellipse is not at the center of the non-report area 830. The ellipse of the touch panel or screen 820 may be enclosed by a rectangle 840 as a coordinate system for approximating or touching positions.

Please refer to FIG. 15, which depicts a flowchart diagram of a touch sensitive processing method applicable to the touch panel or screen 820 as shown in FIG. 8. Because the embodiment as shown in FIG. 15 is already discussed, no further details are elaborated again.

Figure 9:
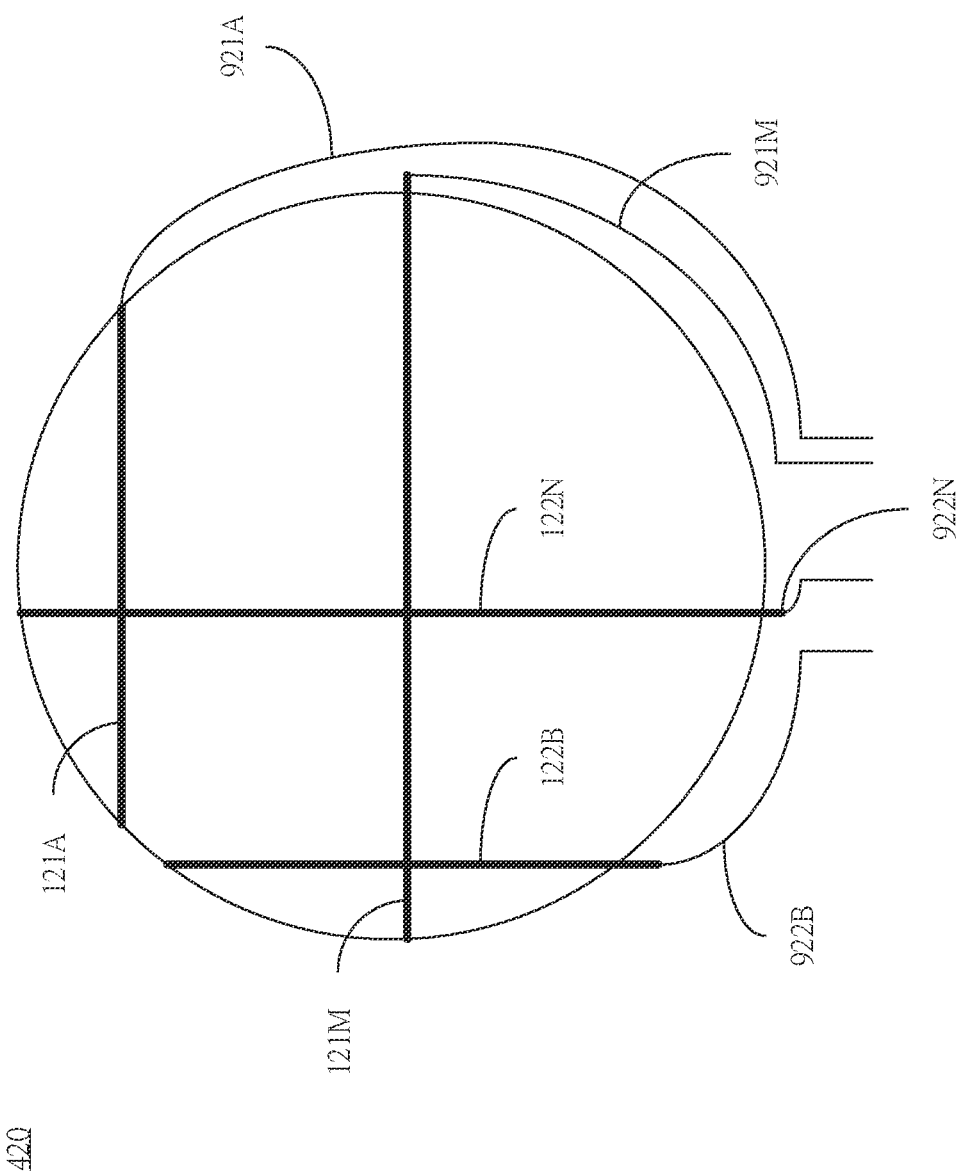
FIG. 9 depicts a top view of a circular touch panel or screen 420 in accordance with an embodiment of the present application.

Please refer to FIG. 9, which depicts a top view of a circular touch panel or screen 420 in accordance with an embodiment of the present application. For convenience, only two parallel first electrodes 121A and 121M and two parallel second electrodes 122B and 122N of the touch panel or screen 420 are shown. The first electrode 121A is connected to the touch sensitive processing apparatus via a wire 921A. The first electrode 121M is connected to the touch sensitive processing apparatus via a wire 921M. Similarly, the second electrode 122B is connected to the touch sensitive processing apparatus via a wire 922B. The second electrode 122N is connected to the touch sensitive processing apparatus via a wire 922N.

Already described above, the other first electrodes 121 and the other second electrodes 122 are similar to the mentioned electrodes connected to the touch sensitive processing apparatus via wires around the lower edge of the touch panel or screen 420. As shown in FIG. 9, lengths of the first electrodes 121A and 121M are different. When the width and material of these two first electrodes 121A and 121M are identical, resistances of these two first electrodes 121A and 121M are different. Hence, different first electrodes 121 have different electric characteristics.

As discussion above, when the driving circuit module 112 and the sensing circuit module 113 of the touch sensitive processing apparatus perform capacitance sensing, the sensed values corresponding to different electrodes having different electric characteristic would be varied consequently. In one embodiment, to level the sensing values corresponding to each of the second electrodes, wave form, time duration, signal strength and/or timing of the driving signals emitted by the driving signal module 112 may be adjusted according to which the first electrode being provided with the driving signals. And the timing (phase difference), amplifying magnitude or gain value of amplifier, work time duration of integral circuit, and/or resistant value of variable resistor of the sensing performed by the sensing circuit module 113 on each of the second electrodes may be adjusted according to which the first electrode being provided with the driving signals. By adjusting the one or mode parameters, the sensing values gathered by the sensing circuit module 113 can be leveled.

However, even when the discussed method is applied to perform capacitance sensing, there may still exist problems of non-even sensing values. The widths of wires may be adjusted to level the sensing values. In one embodiment, in order to simplify manufacture process, the length, material and width of the touch electrodes of the touch panel or screen 420 are fixed and the length and material of the wires are fixed. Hence, the widths of the wires may be adjusted according to lengths of the wires and their respective touch electrodes such that the resistance values corresponding to the touch electrodes and the wires are as even as possible. Because the capacitance sensing is on a resistor-capacitor circuit, when the resistance values are approximately consistent, the measured capacitance changes would be correctly.

Although the embodiment as shown in FIG. 9 is applicable to a circular touch panel or screen, the person having ordinary skill in the art can understand that it may be applicable to an oval touch panel or screen. In one embodiment, the first and the second electrodes of the touch panel or screen are in parallel to the major and the minor axes, respectively.

According to an embodiment of the present application, a touch sensitive processing method is provided. The touch sensitive processing method comprising: performing capacitance sensing by a touch panel to gather an approximating or touching position of an external conductive object with regard to the touch panel; determining whether the approximating or touching position is within a non-report area, wherein a shape of the non-report area is a circle or an ellipse; when the approximating or touching position is determined outside the non-report area, reporting the approximating or touching position to a host; and when the approximating or touching position is determined inside the non-report area, ignoring the approximating or touching position.

Preferably, in order to provide an annulus report area on a rectangular touch panel, when the approximating or touching position is outside the non-report area, the touch sensitive processing method further comprises: determining whether the approximating or touching position is within a report area, wherein the report area includes the non-report area, and a shape of the report area is a circle or an ellipse; when the approximating or touching position is within the report area, reporting the approximating or touching position to the host; when the approximating or touching position is outside the report area, ignoring the approximating or touching position.

Preferably, in order to quickly determining whether the approximating or touching position is required to be reported to the host for saving computing resources or memory resources to record the position of the non-report area and to determine whether the approximating or touching position is within the non-report area, when the shape of the non-report area is a circle, the determining whether the approximating or touching position is within a non-report area comprises: calculating a first function value $(x-Cx)^2+(y-Cy)^2$, where coordinates of the approximating or touching position are (x, y), a center of the non-report area is at (Cx, Cy); calculating a square value of a radius of the non-report area; comparing the first function value with the square value of the radius of the non-report area; when the first function value is larger than the square value, it is determined that the approximating or touching position is outside the non-report area; and when the first function value is smaller than the square value, it is determined that the approximating or touching position is within the non-report area, when the shape of the non-report area is an ellipse, the determining whether the approximating or touching position is within a non-report area comprises calculating a second function value $(x-Cx)^2/a^2+(y-Cy)^2/b^2$, where a length of one of the major and the minor axes in parallel to an axis "x" is "a" and a length of another one of the major and the minor axes in parallel to an axis "y" is "b"; comparing the second function value with 1; when the second function value is larger than 1, it is determined that the approximating or touching position is outside the non-report area; and when the second function value equals to or less than 1, it is determined that the approximating or touching position is within the non-report area.

Preferably, in order to quickly determining whether the approximating or touching position is required to be reported to the host for saving computing resources or memory resources to record the position of the report area and to determine whether the approximating or touching position is within the report area, when the shape of the report area is a circle, the determining whether the approximating or touching position is within a report area comprises: calculating a first function value $(x-Cx)^2+(y-Cy)^2$, where coordinates of the approximating or touching position are (x, y), a center of the report area is at (Cx, Cy); calculating a square value of a radius of the report area; comparing the first function value with the square value of the radius of the report area; when the first function value is larger than the square value, it is determined that the approximating or touching position is outside the report area; and when the first function value is smaller than the square value, it is determined that the approximating or touching position is within the report area, when the shape of the non-report area is an ellipse, the determining whether the approximating or touching position is within a report area comprises calculating a second function value $(x-Cx)^2/a^2+(y-Cy)^2/b^2$, where a length of one of the major and the minor axes in parallel to an axis "x" is "a" and a length of another one of the major and the minor axes in parallel to an axis "y" is "b"; comparing the second function value with 1; when the second function value is larger than 1, it is determined that the approximating or touching position is outside the report area; and when the second function value equals to or less than 1, it is determined that the approximating or touching position is within the report area.

Preferably, in order to provide asymmetric and annulus touch sensitive area, wherein a center of the report area is not at a center of the non-report area.

Preferably, in order to utilize non-rectangular touch panel, wherein a shape of the touch panel is a circle or an ellipse, an original point of a two-axis coordinate system is at a corner of a rectangle encloses the circle or the ellipse, wherein two opposite edges of the rectangle meet edges of the touch panel.

Preferably, in order to simplify design complexity and to reduce required computing resource, wherein the touch panel comprises multiple first electrodes in parallel to a first axis and multiple second electrodes in parallel to a second axis, a shape of the touch panel is an ellipse, a major and a minor axes of the ellipse are in parallel to the first and the second axes, respectively.

Preferably, in order to let multiple touch electrodes have similar resistance characteristics, the touch panel comprises multiple first electrodes in parallel to a first axis and multiple second electrodes in parallel to a second axis, each of the first and the second electrodes connects to a touch sensitive processing apparatus via a wire, wherein at least two of the wires made by same material have different widths and lengths.

Preferably, in order to apply angular coordinates in gesture recognition, wherein the approximating or touching position being reported to the host is represented by angular coordinates, wherein the angular coordinates are corresponding to a center of the non-report area and a direction in parallel to a touch electrode of the touch panel.

Preferably, in order to apply angular coordinates in gesture recognition, wherein the approximating or touching position being reported to the host is represented by angular coordinates, wherein the angular coordinates are corresponding to a center of the report area and a direction in parallel to a touch electrode of the touch panel.

According to an embodiment of the present application, a touch sensitive processing apparatus for connecting to a touch panel is provided. The touch sensitive processing apparatus comprising: an interconnection network for connecting multiple touch electrodes of the touch panel; a driving circuit for connecting to the interconnection network; a sensing circuit for connecting to the interconnection network; and a processor configured for executing instructions stored in a non-volatile memory to realize: having the interconnection network, the driving circuit and the sensing circuit performing capacitance sensing by the touch electrodes to gather an approximating or touching position of an external conductive object with regard to the touch panel; determining whether the approximating or touching position is within a non-report area, wherein a shape of the non-report area is a circle or an ellipse; when the approximating or touching position is determined outside the non-report area, reporting the approximating or touching position to a host; and when the approximating or touching position is determined inside the non-report area, ignoring the approximating or touching position.

Preferably, in order to provide an annulus report area on a rectangular touch panel, when the approximating or touching position is outside the non-report area, the processor is further configured to realize: determining whether the approximating or touching position is within a report area, wherein the report area includes the non-report area, and a shape of the report area is a circle or an ellipse; when the approximating or touching position is within the report area, reporting the approximating or touching position to the host; when the approximating or touching position is outside the report area, ignoring the approximating or touching position.

Preferably, in order to quickly determining whether the approximating or touching position is required to be reported to the host for saving computing resources or memory resources to record the position of the non-report area and to determine whether the approximating or touching position is within the non-report area, when the shape of the non-report area is a circle, the determining whether the approximating or touching position is within a non-report area comprises calculating a first function value $(x-Cx)^2+(y-Cy)^2$, where coordinates of the approximating or touching position are (x, y), a center of the non-report area is at (Cx, Cy); calculating a square value of a radius of the non-report area; comparing the first function value with the square value of the radius of the non-report area; when the first function value is larger than the square value, it is determined that the approximating or touching position is outside the non-report area; and when the first function value is smaller than the square value, it is determined that the approximating or touching position is within the non-report area, when the shape of the non-report area is an ellipse, the determining whether the approximating or touching position is within a non-report area comprises calculating a second function value $(x-Cx)^2/a^2+(y-Cy)^2/b^2$, where a length of one of the major and the minor axes in parallel to an axis "x" is "a" and a length of another one of the major and the minor axes in parallel to an axis "y" is "b"; comparing the second function value with 1; when the second function value is larger than 1, it is determined that the approximating or touching position is outside the non-report area; and when the second function value equals to or less than 1, it is determined that the approximating or touching position is within the non-report area.

Preferably, in order to quickly determining whether the approximating or touching position is required to be reported to the host for saving computing resources or memory resources to record the position of the report area and to determine whether the approximating or touching position is within the report area, when the shape of the report area is a circle, the determining whether the approximating or touching position is within a report area comprises: calculating a first function value $(x-Cx)^2+(y-Cy)^2$, where coordinates of the approximating or touching position are (x, y), a center of the report area is at (Cx, Cy); calculating a square value of a radius of the report area; comparing the first function value with the square value of the radius of the report area; when the first function value is larger than the square value, it is determined that the approximating or touching position is outside the report area; and when the first function value is smaller than the square value, it is determined that the approximating or touching position is within the report area, when the shape of the non-report area is an ellipse, the determining whether the approximating or touching position is within a report area comprises calculating a second function value $(x-Cx)^2/a^2+(y-Cy)^2/b^2$, where a length of one of the major and the minor axes in parallel to an axis "x" is "a" and a length of another one of the major and the minor axes in parallel to an axis "y" is "b"; comparing the second function value with 1; when the second function value is larger than 1, it is determined that the approximating or touching position is outside the report area; and when the second function value equals to or less than 1, it is determined that the approximating or touching position is within the report area.

Preferably, in order to provide asymmetric and annulus touch sensitive area, wherein a center of the report area is not at a center of the non-report area.

Preferably, in order to utilize non-rectangular touch panel, wherein a shape of the touch panel is a circle or an ellipse, an original point of a two-axis coordinate system is at a corner of a rectangle encloses the circle or the ellipse, wherein two opposite edges of the rectangle meet edges of the touch panel.

Preferably, in order to simplify design complexity and to reduce required computing resource, wherein the touch panel comprises multiple first electrodes in parallel to a first axis and multiple second electrodes in parallel to a second axis, a shape of the touch panel is an ellipse, a major and a minor axes of the ellipse are in parallel to the first and the second axes, respectively.

Preferably, in order to let multiple touch electrodes have similar resistance characteristics, the touch panel comprises multiple first electrodes in parallel to a first axis and multiple second electrodes in parallel to a second axis, each of the first and the second electrodes connects to a touch sensitive processing apparatus via a wire, wherein at least two of the wires made by same material have different widths and lengths.

Preferably, in order to apply angular coordinates in gesture recognition, wherein the approximating or touching position being reported to the host is represented by angular coordinates, wherein the angular coordinates are corresponding to a center of the non-report area and a direction in parallel to a touch electrode of the touch panel.

Preferably, in order to apply angular coordinates in gesture recognition, wherein the approximating or touching position being reported to the host is represented by angular coordinates, wherein the angular coordinates are corresponding to a center of the report area and a direction in parallel to a touch electrode of the touch panel.

According to an embodiment of the present application, an electronic system with touch sensitive function comprising aforementioned touch sensitive processing apparatus and touch panel.

According to an embodiment of the present application, a touch panel is provided. A shape of the touch panel is a circle or an ellipse. The touch panel comprising multiple first electrodes in parallel to a first axis and multiple second electrodes in parallel to a second axis, each of the first and the second electrodes is connected to a touch sensitive processing apparatus via a wire, wherein at least two of the wires made by same material have different widths and lengths.

The touch panel and its associated touch sensitive processing method, apparatus and electronic systems have annulus touch sensitive areas for specific applications. Annulus touch gestures may be applied to multiple scenarios such as digital knob simulation, angle setting etc. The present application may not need to record coordinates of the non-report area and coordinates outside of the report area. Hence memory space may be saved. Because it does not need to compare with the coordinates, computing resources for comparison may be saved. Accordingly, memory resource and computing resource can be reduced and so does execution time.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch sensitive processing method, comprising:
performing capacitance sensing by a touch panel to gather an approximating or touching position of an external conductive object with regard to the touch panel;
determining whether the approximating or touching position is within a non-report area, wherein a shape of the non-report area is a circle or an ellipse;
when the approximating or touching position is determined outside the non-report area and in a report area, reporting the approximating or touching position to a host; and
when the approximating or touching position is determined inside the non-report area, ignoring the approximating or touching position,
wherein the non-report area is completely surrounded by the report area.

2. The touch sensitive processing method of claim 1, wherein when the approximating or touching position is outside the non-report area, the touch sensitive processing method further comprises:
determining whether the approximating or touching position is within a report area, wherein the report area includes the non-report area, and a shape of the report area is a circle or an ellipse;
when the approximating or touching position is within the report area, reporting the approximating or touching position to the host; and
when the approximating or touching position is outside the report area, ignoring the approximating or touching position.

3. The touch sensitive processing method of claim 1,
wherein when the shape of the non-report area is a circle, the determining whether the approximating or touching position is within a non-report area comprises:
calculating a first function value $(x-Cx)^2+(y-Cy)^2$, where coordinates of the approximating or touching position are $(x, y)$, a center of the non-report area is at $(Cx, Cy)$;
calculating a square value of a radius of the non-report area;
comparing the first function value with the square value of the radius of the non-report area;
when the first function value is larger than the square value, it is determined that the approximating or touching position is outside the non-report area; and
when the first function value is smaller than the square value, it is determined that the approximating or touching position is within the non-report area,
wherein when the shape of the non-report area is an ellipse, the determining whether the approximating or touching position is within a non-report area comprises:
calculating a second function value $(x-Cx)^2/a^2+(y-Cy)^2/b^2$, where a length of one of the major and the minor axes in parallel to an axis "x" is "a" and a length of another one of the major and the minor axes in parallel to an axis "y" is "b";
comparing the second function value with 1;
when the second function value is larger than 1, it is determined that the approximating or touching position is outside the non-report area; and
when the second function value equals to or less than 1, it is determined that the approximating or touching position is within the non-report area.

4. The touch sensitive processing method of claim 2,
wherein when the shape of the report area is a circle, the determining whether the approximating or touching position is within a report area comprises:
calculating a first function value $(x-Cx)^2+(y-Cy)^2$, where coordinates of the approximating or touching position are $(x, y)$, a center of the report area is at $(Cx, Cy)$;
calculating a square value of a radius of the report area;
comparing the first function value with the square value of the radius of the report area;
when the first function value is larger than the square value, it is determined that the approximating or touching position is outside the report area; and
when the first function value is smaller than the square value, it is determined that the approximating or touching position is within the report area,
wherein when the shape of the non-report area is an ellipse, the determining whether the approximating or touching position is within a report area comprises:
calculating a second function value $(x-Cx)^2/a^2+(y-Cy)^2/b^2$, where a length of one of the major and the minor axes in parallel to an axis "x" is "a" and a length of another one of the major and the minor axes in parallel to an axis "y" is "b";
comparing the second function value with 1;

when the second function value is larger than 1, it is determined that the approximating or touching position is outside the report area; and when the second function value equals to or less than 1, it is determined that the approximating or touching position is within the report area.

5. The touch sensitive processing method of claim 2, wherein a center of the report area is not at a center of the non-report area.

6. The touch sensitive processing method of claim 1, wherein a shape of the touch panel is a circle or an ellipse, an original point of a two-axis coordinate system is at a corner of a rectangle encloses the circle or the ellipse, wherein two opposite edges of the rectangle meet edges of the touch panel.

7. The touch sensitive processing method of claim 6, wherein the touch panel comprises multiple first electrodes in parallel to a first axis and multiple second electrodes in parallel to a second axis, a shape of the touch panel is an ellipse, a major and a minor axes of the ellipse are in parallel to the first and the second axes, respectively.

8. The touch sensitive processing method of claim 6, the touch panel comprises multiple first electrodes in parallel to a first axis and multiple second electrodes in parallel to a second axis, each of the first and the second electrodes connects to a touch sensitive processing apparatus via a wire, wherein at least two of the wires made by same material have different widths and lengths.

9. The touch sensitive processing method of claim 1, wherein the approximating or touching position being reported to the host is represented by angular coordinates, wherein the angular coordinates are corresponding to a center of the non-report area and a direction in parallel to a touch electrode of the touch panel.

10. The touch sensitive processing method of claim 2, wherein the approximating or touching position being reported to the host is represented by angular coordinates, wherein the angular coordinates are corresponding to a center of the report area and a direction in parallel to a touch electrode of the touch panel.

11. A touch sensitive processing apparatus, comprising:
an interconnection network for connecting multiple touch electrodes of a touch panel;
a driving circuit for connecting to the interconnection network;
a sensing circuit for connecting to the interconnection network; and
a processor configured for executing instructions stored in a non-volatile memory to realize:
having the interconnection network, the driving circuit and the sensing circuit performing capacitance sensing by the touch electrodes to gather an approximating or touching position of an external conductive object with regard to the touch panel;
determining whether the approximating or touching position is within a non-report area, wherein a shape of the non-report area is a circle or an ellipse;
when the approximating or touching position is determined outside the non-report area, reporting the approximating or touching position to a host; and
when the approximating or touching position is determined inside the non-report area, ignoring the approximating or touching position,
wherein the non-report area is completely surrounded by the report area.

12. The touch sensitive apparatus of claim 11, wherein when the approximating or touching position is outside the non-report area, the processor is further configured to realize:
determining whether the approximating or touching position is within a report area, wherein the report area includes the non-report area, and a shape of the report area is a circle or an ellipse;
when the approximating or touching position is within the report area, reporting the approximating or touching position to the host; and
when the approximating or touching position is outside the report area, ignoring the approximating or touching position.

13. The touch sensitive apparatus of claim 11,
wherein when the shape of the non-report area is a circle, the determining whether the approximating or touching position is within a non-report area comprises:
calculating a first function value $(x-Cx)^2+(y-Cy)^2$, where coordinates of the approximating or touching position are (x, y), a center of the non-report area is at (Cx, Cy);
calculating a square value of a radius of the non-report area; comparing the first function value with the square value of the radius of the non-report area;
when the first function value is larger than the square value, it is determined that the approximating or touching position is outside the non-report area; and
when the first function value is smaller than the square value, it is determined that the approximating or touching position is within the non-report area,
wherein when the shape of the non-report area is an ellipse, the determining whether the approximating or touching position is within a non-report area comprises:
calculating a second function value $(x-Cx)^2/a^2+(y-Cy)^2/b^2$, where a length of one of the major and the minor axes in parallel to an axis "x" is "a" and a length of another one of the major and the minor axes in parallel to an axis "y" is "b";
comparing the second function value with 1;
when the second function value is larger than 1, it is determined that the approximating or touching position is outside the non-report area; and
when the second function value equals to or less than 1, it is determined that the approximating or touching position is within the non-report area.

14. The touch sensitive apparatus of claim 12,
wherein when the shape of the report area is a circle, the determining whether the approximating or touching position is within a report area comprises:
calculating a first function value $(x-Cx)^2+(y-Cy)^2$, where coordinates of the approximating or touching position are (x, y), a center of the report area is at (Cx, Cy);
calculating a square value of a radius of the report area; comparing the first function value with the square value of the radius of the report area;
when the first function value is larger than the square value, it is determined that the approximating or touching position is outside the report area; and
when the first function value is smaller than the square value, it is determined that the approximating or touching position is within the report area,
wherein when the shape of the non-report area is an ellipse, the determining whether the approximating or touching position is within a report area comprises:
calculating a second function value $(x-Cx)^2/a^2+(y-Cy)^2/b^2$, where a length of one of the major and the minor axes in parallel to an axis "x" is "a" and a length of another one of the major and the minor axes in parallel to an axis "y" is "b";

comparing the second function value with 1;

when the second function value is larger than 1, it is determined that the approximating or touching position is outside the report area; and when the second function value equals to or less than 1, it is determined that the approximating or touching position is within the report area.

15. The touch sensitive apparatus of claim 12, wherein a center of the report area is not at a center of the non-report area.

16. The touch sensitive apparatus of claim 11, wherein a shape of the touch panel is a circle or an ellipse, an original point of a two-axis coordinate system is at a corner of a rectangle encloses the circle or the ellipse, wherein two opposite edges of the rectangle meet edges of the touch panel.

17. The touch sensitive apparatus of claim 16, wherein the touch panel comprises multiple first electrodes in parallel to a first axis and multiple second electrodes in parallel to a second axis, a shape of the touch panel is an ellipse, a major and a minor axes of the ellipse are in parallel to the first and the second axes, respectively.

18. The touch sensitive apparatus of claim 16, the touch panel comprises multiple first electrodes in parallel to a first axis and multiple second electrodes in parallel to a second axis, each of the first and the second electrodes connects to a touch sensitive processing apparatus via a wire, wherein at least two of the wires made by same material have different widths and lengths.

19. The touch sensitive apparatus of claim 11, wherein the approximating or touching position being reported to the host is represented by angular coordinates, wherein the angular coordinates are corresponding to a center of the non-report area and a direction in parallel to a touch electrode of the touch panel.

20. The touch sensitive apparatus of claim 12, wherein the approximating or touching position being reported to the host is represented by angular coordinates, wherein the angular coordinates are corresponding to a center of the report area and a direction in parallel to a touch electrode of the touch panel.

21. An electronic system with touch sensitive function comprising the touch sensitive processing apparatus and the touch panel of claim 11.

22. A touch panel, wherein a shape of the touch panel is a circle or an ellipse, the touch panel comprising multiple first electrodes in parallel to a first axis and multiple second electrodes in parallel to a second axis, each of the first and the second electrodes is connected to a touch sensitive processing apparatus via a wire, wherein at least two of the wires made by same material have different widths and lengths such that resistances of the wires and corresponding electrodes are consistent.

* * * * *